US012650792B2

(12) United States Patent
Dong et al.

(10) Patent No.: US 12,650,792 B2
(45) Date of Patent: Jun. 9, 2026

(54) DATA READ-WRITE METHOD AND SYSTEM, AND DEVICE AND STORAGE MEDIUM

(71) Applicant: SUZHOU METABRAIN INTELLIGENT TECHNOLOGY CO., LTD., Suzhou (CN)

(72) Inventors: Peiqiang Dong, Suzhou (CN); Lu Lu, Suzhou (CN); Tiejun Liu, Suzhou (CN); Jun Yang, Suzhou (CN); Dafeng Han, Suzhou (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 19/470,776

(22) PCT Filed: Dec. 3, 2024

(86) PCT No.: PCT/CN2024/136500
§ 371 (c)(1),
(2) Date: Sep. 29, 2025

(87) PCT Pub. No.: WO2025/167292
PCT Pub. Date: Aug. 14, 2025

(65) Prior Publication Data
US 2026/0119083 A1 Apr. 30, 2026

(30) Foreign Application Priority Data
Feb. 5, 2024 (CN) .......................... 202410166050.0

(51) Int. Cl.
*G06F 3/06* (2006.01)
(52) U.S. Cl.
CPC .......... *G06F 3/0659* (2013.01); *G06F 3/0613* (2013.01); *G06F 3/0683* (2013.01)
(58) Field of Classification Search
CPC ..... G06F 3/0659; G06F 3/0613; G06F 3/0683
See application file for complete search history.

(56) References Cited

U.S. PATENT DOCUMENTS 9,128,629 B1 9/2015 Mao et al.
2009/0307473 A1 12/2009 Miller et al.
(Continued)

FOREIGN PATENT DOCUMENTS

CN 104571957 A 4/2015
CN 107391400 A 11/2017
(Continued)

OTHER PUBLICATIONS

Tan Haiqing, et al., "Design of DDR3 protocol parsing logic based on FPGA." Journal of Computer Applications. 37 (5): 1223-1228, 1256. May 10, 2017.
(Continued)

*Primary Examiner* — Ryan Bertram
(74) *Attorney, Agent, or Firm* — IPro, PLLC

(57) ABSTRACT

The present disclosure discloses a data read and write method. The method is applied to a logical management controller, where the logical management controller communicates with a central processing unit (CPU) and at least two expanded memory controllers respectively based on a compute express link (CXL) protocol, the logical management controller includes a request parsing module, an address decoding module, a request decomposition module and a request allocation module, and the method includes: parsing a received data read and write request for target data to obtain a local command; performing command parsing on the local command to determine location information for reading and writing data; generating a plurality of data read and write sub-requests based on the location information; sending the plurality of data read and write sub-requests to target expanded memory controllers; and controlling the target expanded memory controllers to perform data read and write operations in parallel according to the plurality of data read and write sub-requests.

20 Claims, 4 Drawing Sheets

(56) References Cited

U.S. PATENT DOCUMENTS

| | | | |
|---|---|---|---|
| 2014/0033213 A1 | 1/2014 | Hudson et al. | |
| 2023/0062130 A1* | 3/2023 | Corbetta | G06F 3/0611 |
| 2024/0143539 A1* | 5/2024 | Marcovitch | G06F 3/061 |
| 2025/0094281 A1* | 3/2025 | Lee | G06F 3/0688 |
| 2025/0306772 A1* | 10/2025 | Lee | G06F 3/0619 |
| 2025/0390454 A1* | 12/2025 | Gouk | G06F 13/4022 |

FOREIGN PATENT DOCUMENTS

| | | | |
|---|---|---|---|
| CN | 107608914 A | 1/2018 |
| CN | 113448495 A | 9/2021 |
| CN | 116719755 A | 9/2023 |
| CN | 116880773 A | 10/2023 |
| CN | 117453583 A | 1/2024 |
| CN | 117707991 A | 3/2024 |
| KR | 20190067088 A | 6/2019 |

OTHER PUBLICATIONS

Wang, Yao-hua, and Yang Guo. "The review of state-of-the-art processor architectures for high performance computing." Computer Engineering and Science 42.10 (2020): 1742. Oct. 2020.

* cited by examiner

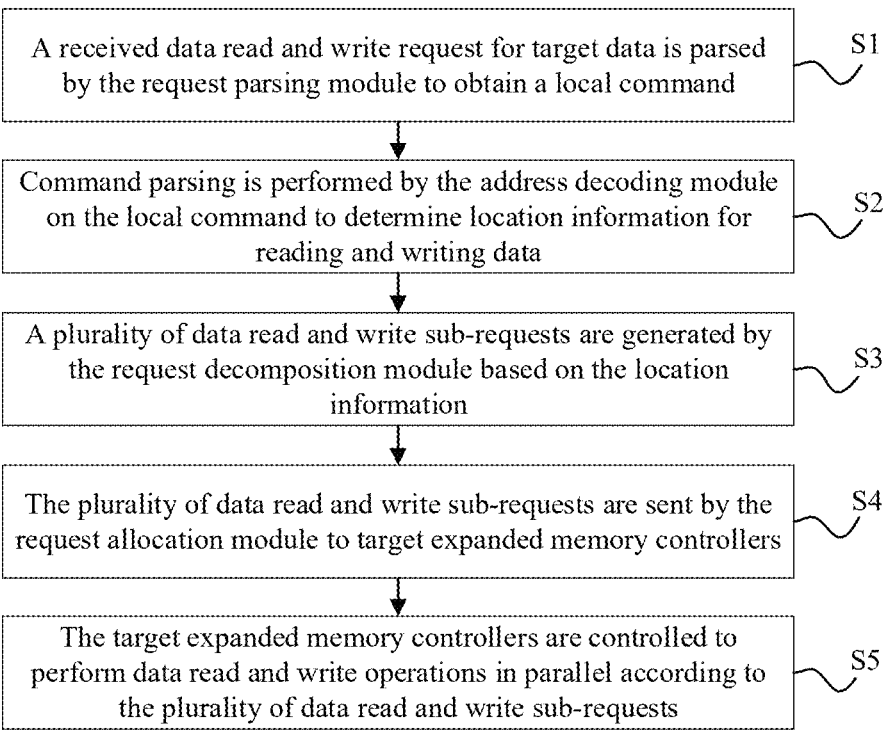

A received data read and write request for target data is parsed by the request parsing module to obtain a local command ~ S1

Command parsing is performed by the address decoding module on the local command to determine location information for reading and writing data ~ S2

A plurality of data read and write sub-requests are generated by the request decomposition module based on the location information ~ S3

The plurality of data read and write sub-requests are sent by the request allocation module to target expanded memory controllers ~ S4

The target expanded memory controllers are controlled to perform data read and write operations in parallel according to the plurality of data read and write sub-requests ~ S5

FIG. 1

Central Processing Unit

Protocol Implementation Module

Expanded Memory Controller 1          Expanded Memory Controller 2     ......     Expanded Memory Controller n Expanded Memory 1          Expanded Memory 2     ......     Expanded Memory n

FIG. 2

DATA READ-WRITE METHOD AND SYSTEM, AND DEVICE AND STORAGE MEDIUM

CROSS-REFERENCE TO RELATED APPLICATION

The present disclosure claims the priority of Chinese patent application filed on Feb. 5, 2024 before the CNIPA, China National Intellectual Property Administration with the application number of 202410166050.0, and the title of "DATA READ AND WRITE METHOD AND SYSTEM, DEVICE AND STORAGE MEDIUM", which is incorporated herein in its entirety by reference.

FIELD

The present disclosure relates to the field of memory expansion technologies, and in particular to a data read and write method and system, a device and a storage medium.

BACKGROUND

At present, a memory access bottleneck of a central processing unit (CPU) comes from a mismatch between CPU clock speed and memory clock speed, and an access bandwidth of memory is a main factor that causes the memory access bottleneck of the CPU. Therefore, how to effectively improve the access bandwidth of the memory and reduce access latency of the memory to improve the efficiency of reading and writing data is currently the focus of research.

SUMMARY

In view of this, the present disclosure provides a data read and write method and system, a device and a storage medium, aiming at improving the access efficiency of expanded memories.

In a first aspect of embodiments of the present disclosure, there is provided a data read and write method, applied to a logical management controller, where the logical management controller communicates with a central processing unit (CPU) and at least two expanded memory controllers respectively based on a compute express link (CXL) protocol, the logical management controller includes a request parsing module, an address decoding module, a request decomposition module and a request allocation module, and the method includes:

parsing, by the request parsing module, a received data read and write request for target data to obtain a local command;

performing, by the address decoding module, command parsing on the local command to determine location information for reading and writing data;

generating, by the request decomposition module, a plurality of data read and write sub-requests based on the location information;

sending, by the request allocation module, the plurality of data read and write sub-requests to target expanded memory controllers; and controlling the target expanded memory controllers to perform data read and write operations in parallel according to the plurality of data read and write sub-requests.

In some embodiments of the present disclosure, in the case where the data read and write request is a data write sub-request, performing, by address decoding module, command parsing on the local command to determine the location information for reading and writing data includes:

performing, by address decoding module, command parsing on the local command to determine a logical starting address, a data length and data content for writing data.

In some embodiments of the present disclosure, generating, by the request decomposition module, the plurality of data read and write sub-requests based on the location information includes:

determining a quantity of write times for writing data according to the data length in the location information;

determining a target quantity of target expanded memories for writing data according to the quantity of write times and a total quantity of expanded memories;

determining target expanded memories for writing data according to the logical starting address and the target quantity; and generating a plurality of data write sub-requests with the same quantity as the quantity of write times and positioning identifiers according to the quantity of write times and the target expanded memories, where the positioning identifiers are configured to determine the target expanded memory controllers to which the plurality of data write sub-requests are sent.

In some embodiments of the present disclosure, determining the target expanded memories for writing data according to the logical starting address and the target quantity includes:

determining the expanded memories corresponding to the logical starting address as the target expanded memories according to the logical starting address; and determining a plurality of expanded memories with the highest idle degree as the target expanded memories according to the idle degree of the expanded memories and the target quantity to obtain the target quantity of target expanded memories.

In some embodiments of the present disclosure, generating the plurality of data write sub-requests with the same quantity as the quantity of write times and the positioning identifiers according to the quantity of write times and the target expanded memories includes:

determining a quantity of data write sub-requests corresponding to the target expanded memories according to the quantity of write times and the target quantity;

determining a plurality of logical starting addresses with the same quantity as the quantity of write times corresponding to the target expanded memories in the target expanded memories according to the quantity of data write sub-requests corresponding to the target expanded memories and a single data write amount; and generating the plurality of data write sub-requests with the same quantity as the quantity of write times and the positioning identifiers according to all the determined logical starting addresses and the single data write amount.

In some embodiments of the present disclosure, sending, by the request allocation module, the plurality of data read and write sub-requests to target expanded memory controllers includes:

sending, by the request allocation module, the plurality of data write sub-requests to the target expanded memory controllers corresponding to the plurality of data write sub-requests respectively according to the positioning identifiers of the plurality of data write sub-requests.

In some embodiments of the present disclosure, sending, by the request allocation module, the plurality of data write sub-requests to the target expanded memory controllers corresponding to the plurality of data write sub-requests respectively according to the positioning identifiers of the plurality of data write sub-requests includes:

sending, by the request allocation module, the plurality of data write sub-requests to command queues of the target expanded memory controllers corresponding to the plurality of data write sub-requests respectively according to the positioning identifiers of the plurality of data write sub-requests; and in the case where all the data write sub-requests are sent, notifying the target expanded memory controllers to read the data write sub-requests in the command queues.

In some embodiments of the present disclosure, the method further includes:

dividing the data content into a plurality of data fragments with the same quantity as the quantity of write times according to the quantity of write times; and sequentially and cyclically storing the plurality of data fragments in cache areas of the target expanded memories according to the determined target expanded memories.

In some embodiments of the present disclosure, controlling the target expanded memory controllers to perform data read and write operations in parallel according to the plurality of data read and write sub-requests includes:

controlling the target expanded memory controllers to obtain the data write sub-requests in the command queues in parallel; and controlling the target expanded memory controllers to perform write operations in parallel on the data fragments in the cache areas corresponding to the target expanded memory controllers according to the obtained data write sub-requests in the command queues.

In some embodiments of the present disclosure, determining the quantity of write times for writing data according to the data length in the location information includes:

determining a single data write amount according to the data length in the location information; and determining a quantity of write times for writing data according to the data length in the location information and the single data write amount.

In some embodiments of the present disclosure, determining the target quantity of target expanded memories for writing data according to the quantity of write times and the total quantity of expanded memories includes:

determining a relationship between the quantity of write times and the total quantity of expanded memories;

in the case where the quantity of write times is greater than or equal to the total quantity, determining that the target quantity of target expanded memories for writing data is the total quantity of all expanded memories; and in the case where the quantity of write times is less than the total quantity, determining that the target quantity of target expanded memories for writing data is equal to the quantity of write times.

In some embodiments of the present disclosure, in the case where the data read and write request is a data read sub-request, performing, by address decoding module, command parsing on the local command to determine the location information for reading and writing data includes:

performing, by address decoding module, command parsing on the local command to determine a logical starting address and a data length for reading data.

In some embodiments of the present disclosure, generating, by the request decomposition module, the plurality of data read and write sub-requests based on the location information includes:

determining a first logical starting address and a first data length where all data fragments included in data to be read are located according to the logical starting address and the data length; and generating a plurality of data read sub-requests with positioning identifiers according to the first logical starting address and the first data length where all data fragments are located, where the positioning identifiers are configured to determine the target expanded memory controllers to which the plurality of data read sub-requests are sent.

In some embodiments of the present disclosure, the method further includes:

determining target expanded memories for reading data according to the first logical starting address where all data fragments are located;

sending, by the request allocation module, the plurality of data read and write sub-requests to target expanded memory controllers includes:

sending, by the request allocation module, the plurality of data read sub-requests to the target expanded memory controllers corresponding to the plurality of data read sub-requests respectively according to the positioning identifiers of the plurality of data read sub-requests.

In some embodiments of the present disclosure, sending, by the request allocation module, the plurality of data read sub-requests to the target expanded memory controllers corresponding to the plurality of data read sub-requests respectively according to the positioning identifiers of the plurality of data read sub-requests includes:

sending, by the request allocation module, the plurality of data read sub-requests to command queues of the target expanded memory controllers corresponding to the plurality of data read sub-requests respectively according to the positioning identifiers of the plurality of data read sub-requests; and in the case where all the data read sub-requests are sent, notifying the target expanded memory controllers to read the data read sub-requests in the command queues.

In some embodiments of the present disclosure, controlling the target expanded memory controllers to perform data read and write operations in parallel according to the plurality of data read and write sub-requests includes:

controlling the target expanded memory controllers to obtain the data read sub-requests in the command queues in parallel;

controlling the target expanded memory controllers to perform read operations in parallel on the target expanded memories corresponding to the target expanded memory controllers according to the obtained data read sub-requests in the command queues, and storing the read data in cache areas corresponding to the target expanded memory controllers;

in the case where all data read operations are completed, performing sorting and packaging on all the read data fragments based on an order in which the read data fragments constitute the target data to obtain the target data; and sending the target data to the CPU.

In a second aspect of the embodiments of the present disclosure, the present disclosure provides a data read and write system, including: a central processing unit (CPU), a logical management controller, expanded memory controllers and expanded memories, where the logical management controller includes a request parsing module, an address decoding module, a request decomposition module and a request allocation module, where the CPU is configured to initiate a data read and write request for target data;

the request parsing module is configured to parse the received data read and write request for the target data to obtain a local command;

the address decoding module is configured to perform command parsing on the local command to determine location information for reading and writing data;

the request decomposition module is configured to generate a plurality of data read and write sub-requests based on the location information;

the request allocation module is configured to send the plurality of data read and write sub-requests to target expanded memory controllers; and the target expanded memory controllers in the expanded memory controllers are configured to control target expanded memories corresponding to the target expanded memory controllers to perform corresponding data read and write operations in parallel according to the received data read and write sub-requests.

In some embodiments of the present disclosure, the logical management controller includes:

a data synthesis module configured to in the case where all data read operations are completed, perform sorting and packaging on all the read data fragments based on an order in which the read data fragments constitute the target data to obtain the target data, and send the target data to the CPU.

In a third aspect of the embodiments of the present disclosure, the present disclosure provides an electronic device, including: a processor, a memory and a computer program stored in the memory and capable of running on the processor, where the computer program, when executed by the processor, cases the processor to implement steps of the data read and write method described in the first aspect of the present disclosure.

In a fourth aspect of the embodiments of the present disclosure, the present disclosure provides a computer non-transitory readable storage medium storing a computer program, where the computer program, when executed by a processor, cases the processor to implement steps of the data read and write method described in the first aspect of the present disclosure.

Compared with the related art, the present disclosure has following advantages.

The embodiments of the present disclosure provide a data read and write method, applied to a logical management controller, where the logical management controller communicates with a central processing unit (CPU) and at least two expanded memory controllers respectively based on a compute express link (CXL) protocol, the logical management controller includes a request parsing module, an address decoding module, a request decomposition module and a request allocation module. When the CPU needs to write target data into an expanded memory (or when there is target data in the expanded memory and the CPU needs to read the target data), the logical management controller receives a data write request (or a data read request) sent by the CPU via compute express link intellectual property (CXL IP); according to the received data write request (or data read request), the request parsing module parses the received data read and write request for target data to obtain a local command; the address decoding module performs command parsing on the local command to determine location information for reading and writing data; the request decomposition module generates a plurality of data write sub-requests (or a plurality of data read sub-requests) based on the location information; the request allocation module sends the plurality of obtained data write sub-requests (or the plurality of data read sub-requests) to target expanded memory controllers which will be used for writing data (or reading data) at present; and the target expanded memory controllers perform write operations on the target data in parallel based on the received data write sub-requests (or data read sub-requests) to realize the write (or read) of the target data. Therefore, in the present disclosure, by introducing the logical management controller, the data read and write request for the target data sent by the CPU is received by the logical management controller, the data read and write request is split into a plurality of sub-requests, the plurality of sub-requests are distributed to the target expanded memory controllers, and then read and write operations for the target data are performed by the target expanded memory controllers in parallel, and thus the bandwidth of the expanded memory is improved by performing, by a plurality of expanded memories, read and write operations for data in parallel, and the access efficiency of the CPU to the expanded memories is improved. At the same time, the logical management controller isolates the direct management of the expanded memory by the CPU, and thus the security of the expanded memory is increased.

The above description is only an overview of technical solutions of the present disclosure. In order to understand technical means of the present disclosure more clearly, it can be implemented according to contents of the specification, and in order to make the above and other purposes, features and advantages of the present disclosure more obvious and understandable, specific embodiments of the present disclosure are provided below.

BRIEF DESCRIPTION OF THE DRAWINGS

In order to more clearly explain the technical solutions in the embodiments of the present disclosure or the related art, the following will briefly introduce accompanying drawings needed in the description of the embodiments or the related art.

FIG. 1 is a flowchart of a data read and write method provided in some embodiments of the present disclosure.

FIG. 2 is an architecture diagram of a memory expansion system based on a compute express link (CXL) protocol in the related art.

DETAILED DESCRIPTION

Figures 3, 4:
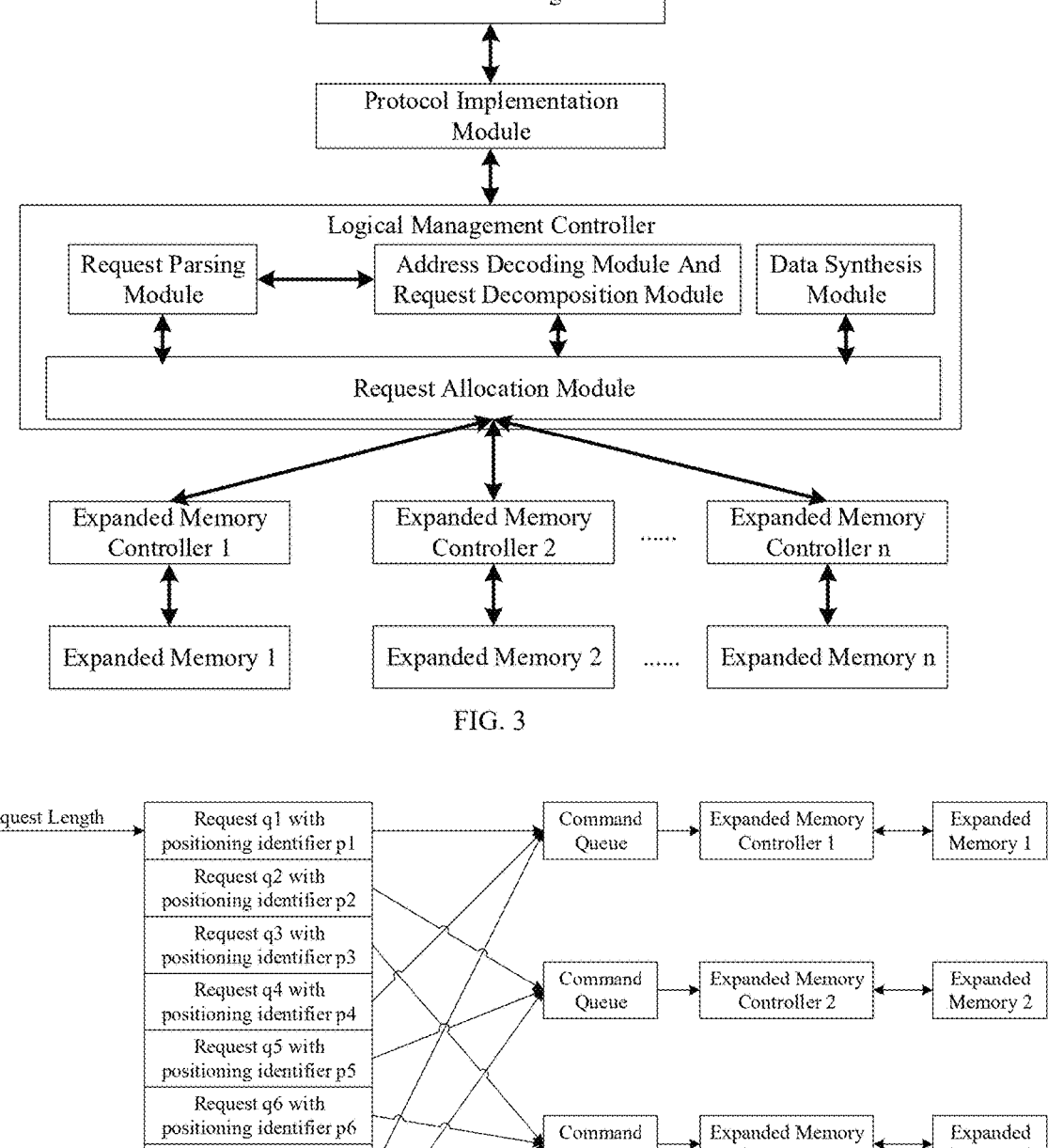
FIG. 3 is an architecture diagram of a memory expansion system to which a data read and write method provided in some embodiments of the present disclosure is applied.
FIG. 4 is a flowchart of data read and write request distribution in a data read and write method provided in some embodiments of the present disclosure.

Exemplary embodiments of the present disclosure will be described in more detail below with reference to the accompanying drawings.

In order to facilitate the understanding of the embodiments of the present disclosure, the following related technical terms are explained.

FPGA (Field Programmable Gate Array): a programmable logic device.

CXL (Compute Express Link): a new high-speed interconnection standard for computing.

CXL IP (Compute Express Link intellectual property): an intellectual property core of a CXL protocol, which belongs to a hardware module for implementing the CXL protocol.

Before explaining the present disclosure, the background of the current related art will be explained.

CXL (Compute Express Link) is an open standard adopted by the industry, which regulates physical and electrical interface connections based on a peripheral component interface express (PCIe). The CXL includes three sub-protocols, namely CXL.io, CXL.cache and CXL.mem. The CXL.mem protocol uses load commands and store commands to provide access to memories of connected devices for the CPU of a host, where the CPU of the host acts as a master device, and the CXL device acts as a slave device, so as to realize memory expansion and pooling. The open standard provides a consistent interconnection of high-speed cache for processors, memory expansion and accelerators. For the CXL memory solution implemented based on the FPGA at present, from the perspective of the CPU, memories (MEMs) of all channels are organized into a unified address space, and data access is in an order of the channels, that is, when accessing a certain channel, other channels are in an idle state, resulting in low access efficiency. For example, the CPU initiates a task request to an expanded memory through the CXL, the CXL parses the task request, due to characteristics of the expanded memory itself, factors such as row and column gating, refreshing and read delay need to be carried out, and thus delay time cannot be further reduced due to hardware factors. Moreover, the expanded memory based on the CXL has a unified address allocation on the CPU side, that is, a first expanded memory MEM1 occupies an address space BaseAddr+N1(GB), a second expanded memory MEM2 occupies an address space BaseAddr+N1(GB, gigabyte, billion bytes)+N2(GB), and a third expanded memory MEM3 occupies an address space BaseAddr+N1(GB)+N2(GB)+N3(GB). At the same time, since the task request initiated by the CPU is a continuous address access, when the address falls in a certain expanded memory, the memory request is to read the expanded memory in an order of the address until the request is completed. At this time, other expanded memories are in an idle waiting state, resulting in that only one expanded memory may be accessed at the same time, thereby reducing the bandwidth of the expanded memory and having low access efficiency. In view of this, in the present disclosure, by introducing the logical management controller, the data read and write request for the target data sent by the CPU is received by the logical management controller, the data read and write request is split into a plurality of sub-requests, the plurality of sub-requests are distributed to the target expanded memory controllers, and then read and write operations for the target data are performed by the target expanded memory controllers in parallel, and thus the bandwidth of the expanded memory is improved by performing, by a plurality of expanded memories, read and write operations for data in parallel, and the access efficiency of the CPU to the expanded memories is improved. At the same time, the logical management controller isolates the direct management of the expanded memory by the CPU, and thus the security of the expanded memory is increased.

FIG. 1 is a flowchart of a data read and write method provided in some embodiments of the present disclosure. As shown in FIG. 1, the method is applied to a logical management controller, where the logical management controller communicates with a central processing unit (CPU) and at least two expanded memory controllers respectively based on a compute express link (CXL) protocol, the logical management controller includes a request parsing module, an address decoding module, a request decomposition module and a request allocation module. The method includes:

step S1, a received data read and write request for target data is parsed by the request parsing module to obtain a local command;

step S2, command parsing is performed by the address decoding module on the local command to determine location information for reading and writing data;

step S3, a plurality of data read and write sub-requests are generated by the request decomposition module based on the location information;

step S4, the plurality of data read and write sub-requests are sent by the request allocation module to target expanded memory controllers; and step S5, the target expanded memory controllers are controlled to perform data read and write operations in parallel according to the plurality of data read and write sub-requests.

In some embodiments of the present disclosure, as shown in FIG. 2, FIG. 2 is an architecture diagram of a memory expansion system based on a compute express link (CXL) protocol in the related art. The architecture of a memory expansion system applied by the data read and write method provided in some embodiments of the present disclosure is to add the logical management controller on the basis of the architecture of the existing memory expansion system. As shown in FIG. 3, the logical management controller is realized by programming inside a programmable logic device in a board card where the architecture of the memory expansion system is located, and functions of the logical management controller are realized by adding logical functions in the programmable logic device through programming, where the functions of the logical management controller are software functions realized by the programmable logic device. The logical management controller is used to implement steps related to the logical management controller in the data read and write method provided in embodiments of the present disclosure, where the logical management controller includes but is not limited to a field programmable gate array (FPGA). It should be understood that the logical management controller may also realize the functions of the logical management controller by introducing a customized processor into the board card where the architecture of the memory expansion system is located.

In some embodiments of the present disclosure, as shown in FIG. 3, the logical management controller in the present disclosure communicates with each expanded memory controller based on the CXL protocol, and the logical management controller communicates with the CPU through a protocol implementation module (CXL IP) based on the CXL protocol. In the present disclosure, the CPU performs memory expansion based on the CXL protocol, and the entire expansion link regulates physical and electrical interface connections based on the peripheral component interface express (PCIe). The memory expansion system includes three sub-protocols, namely CXL.io, CXL.cache and CXL.mem. The CXL.mem protocol uses load commands and store commands to provide access to memories of connected devices for the CPU (that is, access to the expanded memory), where the CPU acts as the master device, and the CXL device acts as the slave device, so as to realize memory expansion.

In some embodiments of the present disclosure, in the case where the CPU needs to perform a corresponding read and write operation for a specific data, the specific data is the target data, and at this time, the CPU will send a data read and write request for the target data based on the CXL.mem protocol. At this time, the logical management controller will receive the data read and write request through the CXL IP, and generate a plurality of data read and write sub-requests based on the data read and write request to read and write the target data. After generating the plurality of data read and write sub-requests, the logical management controller sends the plurality of generated data read and write sub-requests to a plurality of target expanded memory controllers. Any one of the plurality of data read and write sub-requests will only be sent to one target expanded memory controller, and any one of the plurality of target expanded memory controllers will receive at least one data read and write sub-request. The target expanded memory controller refers to an expanded memory controller currently used to control the corresponding read and write operation of the target data. There is a one-to-one correspondence between the expanded memory controllers with the expanded memories, that is, an expanded memory controller controls an expanded memory corresponding to the expanded memory controller. For example, an expanded memory set for the CPU includes five expanded memories, namely a1 to a5, and correspondingly, there are five expanded memory controllers, namely A1 to A5. In the case where the expanded memory controllers currently used to perform corresponding read and write operations on the target data are the expanded memory controllers A1 to A3, the expanded memory controllers A1 to A3 are the target expanded memory controllers.

In some embodiments of the present disclosure, after each target expanded memory controller receives the data read and write sub-request, the plurality of target expanded memory controllers perform corresponding data read and write operations in parallel based on the received data read and write sub-requests, so as to read and write the target data.

In the case where the CPU needs to perform a corresponding write operation for a specific data, the specific data is the target data, and at this time, the CPU will send a data write request for the target data based on the CXL.mem protocol. At this time, the logical management controller will receive the data write request, generate a plurality of data write sub-requests based on the data write request to perform write operations on the target data, and divide the target data into a plurality of data fragments with the same quantity as the plurality of data write sub-requests. There is a one-to-one correspondence between the data write sub-requests with the data fragments, that is, a data write sub-request is used to write a data fragment corresponding to the data write sub-request. After generating the plurality of data write sub-requests, the logical management controller sends the plurality of generated data write sub-requests to a plurality of target expanded memory controllers. Any one of the data write sub-requests will only be sent to one target expanded memory controller, and any one of the plurality of target expanded memory controllers will receive at least one data write sub-request. After each target expanded memory controller receives the data write sub-request, the plurality of target expanded memory controllers perform corresponding data write operations in parallel based on the received data write sub-requests, so as to write the target data. Therefore, when the CPU needs to write the target data, compared with the previous method that may only write the target data with the bandwidth of one expanded memory, the method for improving the expanded memory provided by the present disclosure may write the target data with the bandwidths of the plurality of expanded memories at the same time, thereby obviously improving the access bandwidth to the expanded memory.

For example, three data write sub-requests x1, x2 and x3 are generated according to the received data write request X for the target data, and correspondingly, the target data Y is divided into three data fragments y1, y2 and y3. The data write sub-request x1 is determined as a data write sub-request for writing the data fragment y1, the data write sub-request x2 is determined as a data write sub-request for writing the data fragment y2, and the data write sub-request x3 is determined as a data write sub-request for writing the data fragment y3. The data write sub-request x1 is sent to the target expanded memory controller A1, the data write sub-request x2 is sent to the target expanded memory controller A2, and the data write sub-request x3 is sent to the target expanded memory controller A3. At this time, the target expanded memory controllers A1 to A3 perform write operations on the data fragments y1 to y3 in parallel based on their own received data write sub-requests, so as to write the target data Y, that is, the target expanded memory controllers A1 to A3 will simultaneously perform write operations on the data fragments based on their own received data write sub-requests. The write operations at this time are that controls the data fragment y1 to be written into the expanded memory a1 corresponding to the target expanded memory controller A1, the target expanded memory controller A2 controls the data fragment y2 to be written into the expanded memory a2 corresponding to the target expanded memory controller A2, and the target expanded memory controller A3 controls the data fragment y3 to be written into the expanded memory a3 corresponding to the target expanded memory controller A3. Compared with the previous method that only one expanded memory may write the target data at the same time based on the data write request, in the present disclosure, the target data may be written to the plurality of expanded memories at the same time based on the plurality of data write sub-requests into which the data write request is divided, thereby effectively improving the access efficiency of the CPU to the expanded memories.

In the case where the CPU needs to perform a corresponding read operation for a specific data, the specific data is the target data, where the target data belongs to data writing realized by the data read and write method provided by the present disclosure; and at this time, the CPU will send a data read request for the target data based on the CXL.mem protocol. At this time, the logical management controller will receive the data read request. Since the target data is previously written by the data read and write method provided by the present disclosure, the logical management controller in the present disclosure will record which expanded memories the target data is written to, and logical addresses corresponding to specific physical addresses in these expanded memories. At this time, the logical management controller will generate a plurality of data read sub-requests based on the recorded expanded memories to which the target data is written and the logical addresses corresponding to the specific physical addresses in the expanded memories, so as to perform read operations on the target data. After generating the plurality of data read sub-requests, the logical management controller sends the plurality of generated data read sub-requests to the corresponding target expanded memory controllers. Any one of the plurality of data read sub-requests will only be sent to one target expanded memory controller, and any one of the plurality of target expanded memory controllers will receive at least one data read sub-request. After each target expanded memory controller receives the data read sub-request, the plurality of target expanded memory controllers perform corresponding data read operations in parallel based on the data read sub-requests, so as to read the target data. Therefore, when the CPU needs to read the target data, compared with the previous method that may only read the target data with the bandwidth of one expanded memory, the method for improving the expanded memory provided by the present disclosure may read the target data with the bandwidths of the plurality of expanded memories at the same time, thereby obviously improving the access bandwidth to the expanded memory.

For example, three data read sub-requests u1, u2 and u3 are generated according to the received data read request U for the target data Y. The data read sub-request u1 is sent to the target expanded memory controller A1, the data read sub-request u2 is sent to the target expanded memory controller A2, and the data read sub-request u3 is sent to the target expanded memory controller A3. At this time, the target expanded memory controllers A1 to A3 perform read operations on the data fragments y1 to y3 in parallel based on their own received data read sub-requests, so as to read the target data Y, that is, the target expanded memory controllers A1 to A3 simultaneously read the data fragments y1, y2, and y3 from the corresponding expanded memories based on their own received data read sub-requests, so as to read the target data Y. Compared with the previous method that only one expanded memory may read the target data at the same time based on the read data request, in the present disclosure, the target data may be written to the plurality of expanded memories at the same time based on the plurality of data read sub-requests into which the read data request is divided, thereby effectively improving the access efficiency of the CPU to the expanded memories.

In some embodiments of the present disclosure, the data read and write request sent by the CPU is a request data packet, however, in the present disclosure, only key data read and write location information is needed when generating the data read and write sub-request. Therefore, the logical management controller in the present disclosure at least includes the request parsing module, the address decoding module, the request decomposition module and the request allocation module. The request parsing module in the logical management controller is used to perform data packet parsing processing on the received data read and write request sent by the CPU to obtain a corresponding local command. The local command refers to specific data in the data read and write request obtained by performing data packet parsing processing on the data read and write request.

In some embodiments of the present disclosure, the obtained local command includes a large quantity of fields, and different fields represent different meanings. However, in the present disclosure, when generating the data read and write sub-request, only the key data read and write position information is needed. Therefore, in the present disclosure, after the request parsing module in the logical management controller obtains the corresponding local command by performing data packet parsing processing on the data read and write request, and the address decoding module in the logical management controller further performs command parsing on the local command to determine the location information for reading and writing data from all fields in the local command.

In some embodiments of the present disclosure, after determining the location information for reading and writing data, the plurality of data read and write sub-requests are generated by the request allocation module in the logical management controller based on the location information.

The embodiments of the present disclosure provide a data read and write method, applied to a logical management controller, where the logical management controller communicates with a central processing unit (CPU) and at least two expanded memory controllers respectively based on a compute express link (CXL) protocol, the logical management controller includes a request parsing module, an address decoding module, a request decomposition module and a request allocation module. When the CPU needs to write target data into an expanded memory (or when there is target data in the expanded memory and the CPU needs to read the target data), the logical management controller receives a data write request (or a data read request) sent by the CPU via compute express link intellectual property (CXL IP); according to the received data write request (or data read request), the request parsing module parses the received data read and write request for target data to obtain a local command; the address decoding module performs command parsing on the local command to determine location information for reading and writing data; the request decomposition module generates a plurality of data write sub-requests (or a plurality of data read sub-requests) based on the location information; the request allocation module sends the plurality of obtained data write sub-requests (or the plurality of data read sub-requests) to target expanded memory controllers which will be used for writing data (or reading data) at present; and the target expanded memory controllers perform write operations on the target data in parallel based on the received data write sub-requests (or data read sub-requests) to realize the write (or read) of the target data. Therefore, in the present disclosure, by introducing the logical management controller, the data read and write request for the target data sent by the CPU is received by the logical management controller, the data read and write request is split into a plurality of sub-requests, the plurality of sub-requests are distributed to the target expanded memory controllers, and then read and write operations for the target data are performed by the target expanded memory controllers in parallel, and thus the bandwidth of the expanded memory is improved by performing, by a plurality of expanded memories, read and write operations for data in parallel, and the access efficiency of the CPU to the expanded memories is improved. At the same time, the logical management controller isolates the direct management of the expanded memory by the CPU, and thus the security of the expanded memory is increased.

In combination with the above embodiments, in one implementation, some embodiments of the present disclosure further provide a data read and write method. In the data read and write method, in the case where the data read and write request is a data write sub-request, step S2 is: performing, by address decoding module, command parsing on the local command to determine a logical starting address, a data length and data content for writing data.

In some embodiments of the present disclosure, in the case where the CPU needs to perform a corresponding write operation on the target data, in order to generate a plurality of data write sub-requests based on the data write request sent by the CPU, it is necessary to use the specific logical starting address involved in the data write request to write the target data, that is, from which logical address to start writing the target data, as well as the data length and specific data content of the target data. Therefore, in the case where the CPU needs to perform the corresponding write operation on the target data, one implementation of the above step S2 is: performing, by the address decoding module in the logical management controller, command parsing on the corresponding local command obtained by performing data packet parsing processing to determine the logical starting address for writing the target data, the data length and the specific data content of the target data from all fields in the local command.

In combination with the above embodiments, in one implementation, some embodiments of the present disclosure further provide a data read and write method. In the data read and write method, step S3 can include step S31 to step S34.

Step S31, a quantity of write times for writing data is determined according to the data length in the location information.

Step S32, a target quantity of target expanded memories for writing data is determined according to the quantity of write times and a total quantity of expanded memories.

In some embodiments of the present disclosure, after the target data is stored in the expanded memory, in order to ensure that the data can be read in parallel when the CPU read a part of data content of the target data, in the present disclosure, the target data is divided into a plurality of small data fragments, and then the plurality of small data fragments are stored in different expanded memories in parallel. Correspondingly, for each small data fragment, a corresponding data write sub-request needs to be generated, that is, one data fragment corresponds to one data write sub-request.

Firstly, the quantity of write times required for writing data and the quantity of target expanded memories used to write data fragments of the target data are determined according to the determined data length of the target data to be written, where the quantity is the target quantity of target expanded memories. The longer the data length is, the more the data content of the target data is. At this time, in order to ensure that the data can be read in parallel when the CPU read the part of data content of the target data, in the present disclosure, the target data is divided into more data fragments, and correspondingly, more times of data writing are performed. At the same time, in order to ensure the access efficiency of writing the data fragments of the target data in parallel, the longer the data length, the more expanded memories are involved in the writing of the data fragments of the target data in the present disclosure.

For example, the data content of the target data is z1 to z300, and the data length is 300. After the target data is stored in the expanded memory, in order to ensure that the part of data content (for example, partial data content z1 to z30) of the target data can be read in parallel when the CPU needs to read the part of data content of the target data, the target data is divided into 30 data fragments with a length of 10, that is, z1 to z10, z11 to z20, z21 to z30, . . . , z291 to z300, a total of 30 fragments are written into three expanded memories in a dispersed manner, for example, the first data fragment, the fourth data fragment, . . . , the (3n+1)th data fragment are written into the first expanded memory, the 2nd data fragment, the 5th data fragment, . . . , the (3n+2)th data fragment are written into the 2nd expanded memory, and the 3rd data fragment, the 6th data fragment, . . . , the (3n+3)th data fragment are written into the 3rd expanded memory, where, a value of n is 0 to 9. When the CPU needs to read the part of data content z1 to z30 of the target data, the data content z1 to z30 can be read in parallel from the three expanded memories, that is, for the three expanded memories, z1 to z3 will be read in the first parallel reading process, then z4 to z6 will be read in the second parallel reading process, . . . , and z28 to z30 will be read in the tenth parallel reading process, finally, the data contents of z1 to z30 with a data length of 30 will be read at the same time with the total bandwidth of the three expanded memories. When the length of the target data is longer, the quantity of divided data fragments will be more, and the corresponding quantity of write times will be more.

Step S33, target expanded memories for writing data are determined according to the logical starting address and the target quantity.

In some embodiments of the present disclosure, the logical starting address and the data length for writing the target data can be determined from the data write request sent by the CPU through the above step S2. The logical starting address represents a logical address from which the CPU wants to start writing the target data and a data length of the target data that needs to be written. There is a one-to-one mapping relationship between the logical address and a physical address of the expanded memory, and thus the physical address of the expanded memory corresponding to the logical starting address can be determined based on the logical starting address, and the expanded memory to which the physical address belongs can be determined based on the physical address. After determining the expanded memory to which the physical address belongs, the expanded memory is determined as the first target expanded memory for writing the data fragments of the target data. Then, several expanded memories are selected from all the expanded memories configured for the CPU based on the determined target quantity and determined as the target expanded memories for writing the data fragments of the target data, so as to obtain the target expanded memories with the target quantity. For example, in the case where the determined target quantity is 3, after the first target expanded memory is determined, two expanded memories are selected from all the expanded memories configured for the CPU to be determined as the target expanded memories for writing the data fragments of the target data.

Step S34, a plurality of data write sub-requests with the same quantity as the quantity of write times and positioning identifiers are generated according to the quantity of write times and the target expanded memories, where the positioning identifiers are configured to determine the target expanded memory controllers to which the plurality of data write sub-requests are sent.

In some embodiments of the present disclosure, after determining the quantity of write times and the target expanded memory for writing the data fragments of the target data, the plurality of data write sub-requests with the same quantity as the quantity of write times and positioning identifiers are generated. The positioning identifiers of the data write sub-requests are used to determine which target expanded memory controller the data write sub-request should be sent to for performing the corresponding data write operation.

For example, it is determined that the quantity of write times is 20, and the target expanded memories are a1 and a2. Twenty data write sub-requests q1 to q20 with positioning identifiers are generated based on the determined quantity of write times and each target expanded memory. The data write sub-request q1 has a corresponding positioning identifier p1, the data write sub-request q2 has a corresponding positioning identifier p2, . . . , and the data write sub-request q20 has a corresponding positioning identifier p20. The logical management controller can determine the specific target expanded memory corresponding to each positioning identifier based on a built-in logical algorithm. For example, it is determined that the target expanded memory corresponding to the positioning identifier p1 is a1 based on the positioning identifier p1, and thus the data write sub-request q1 corresponding to the positioning identifier p1 is sent to the target expanded memory controller A1 corresponding to the target expanded memory a1; it is determined that the target expanded memory corresponding to the positioning identifier p2 is a2 based on the positioning identifier p2, and thus the data write sub-request q2 corresponding to the positioning identifier p2 is sent to the target expanded memory controller A2 corresponding to the target expanded memory a2; it is determined that the target expanded memory corresponding to the positioning identifier p3 is a1 based on the positioning identifier p3, and thus the data write sub-request q3 corresponding to the positioning identifier p1 is sent to the target expanded memory controller A1 corresponding to the target expanded memory a1; it is determined that the target expanded memory corresponding to the positioning identifier p4 is a2 based on the positioning identifier p4, and thus the data write sub-request q4 corresponding to the positioning identifier p4 is sent to the target expanded memory controller A2 corresponding to the target expanded memory a2.

In combination with the above embodiments, in one implementation, some embodiments of the present disclosure further provide a data read and write method. In the data read and write method, step S31 can include step S311 to step S312:

step S311, a single data write amount is determined according to the data length in the location information; and step S312, a quantity of write times for writing data is determined according to the data length in the location information and the single data write amount.

In some embodiments of the present disclosure, one implementation of determining the quantity of write times for writing the target data is: obtaining the single data write amount, and obtaining the quantity of write times for writing data by dividing the determined data length of the target data with the single data write amount.

In some embodiments of the present disclosure, the single data write amount may be a fixed value preset by the logical management controller, for example, 10, 50, 100, or the like. Meanwhile, a value of the single data write amount can be determined based on the data length of the target data. An alternative implementation is: determining the single data write amount as a fixed value when the data length of the target data exceeds a certain threshold; and determining the single data write amount as another fixed value when the data length of the target data does not exceed the certain threshold. The advantage of determining the value of the single data write amount based on the data length of the target data is that for the target data with any data size (that is, the data length), when the CPU needs to read a part of data content of the target data, it may simultaneously read in parallel with the bandwidths of a plurality of expanded memories, thereby effectively improving the access efficiency to the expanded memories. For example, if the single data write amount is determined as a fixed value (for example, 50) and the data length of the target data is 500, when the CPU needs to read the part of data content of the target data (for example, partial data with a length of 200 in the target data), it may simultaneously read in parallel with the bandwidths of the plurality of expanded memories; however, when the data length of the target data is only 50, when the CPU needs to read the part of data content of the target data (for example, partial data with a length of 20 in the target data), since the single data write amount is 50, the target data will be written into an expanded memory at one time, and the CPU needs to read only read the part of the target data with the length of 20 from the expanded memory, which will not be conducive to improving the access efficiency to the expanded memories. However, if the value of the single data write amount is determined based on the data length of the target data, the above problem that is not conducive to improving the access efficiency to the expanded memories may be effectively avoided. For example, when the data length of the target data is 500, the corresponding single data write amount is determined to be 50 based on the data length of the target data. For the single data write amount, when the CPU needs to read a part of data content of the target data (for example, the partial data with the length of 200 in the target data), it may simultaneously read in parallel with the bandwidths of the plurality of expanded memories, thereby effectively improving the access efficiency to the expanded memories. When the data length of the target data is 50, the corresponding single data write amount is determined to be 5 based on the data length of the target data. For the single data write amount, when the CPU needs to read the part of data content of the target data (for example, partial data with the length of 20 in the target data), it may simultaneously read in parallel with the bandwidths of the plurality of expanded memories, thereby effectively improving the access efficiency to the expanded memories.

In combination with the above embodiments, in one implementation, some embodiments of the present disclosure further provide a data read and write method. In the data read and write method, step S32 can include step S321 to step S323.

Step S321, a relationship between the quantity of write times and the total quantity of expanded memories is determined.

In some embodiments of the present disclosure, in order to improve the access efficiency to the expanded memories, in the present disclosure, the quantity of target expanded memories for writing the data fragments of the target data, that is, the target quantity of target expanded memories, is determined based on the relationship between the determined quantity of write times and the total quantity of expanded memories configured for the CPU.

Step S322, in the case where the quantity of write times is greater than or equal to the total quantity, it is determined that the target quantity of target expanded memories for writing data is the total quantity of all expanded memories.

In some embodiments of the present disclosure, in the case where the determined quantity of write times is greater than or equal to the total quantity of expanded memories configured for the CPU, it is not possible to write all the data content of the target data at one time even if all the expanded memories are used for writing the data fragments of the target data. At this time, in order to improve the access efficiency to the expanded memories as much as possible, in the present disclosure, all the expanded memories config- ured for the CPU are determined as the target expanded memories under the condition that the determined quantity of write times is greater than or equal to the total quantity of expanded memories configured for the CPU. At this time, the target quantity of target expanded memories is equal to the total quantity of expanded memories configured for the CPU.

Step S323, in the case where the quantity of write times is less than the total quantity, it is determined that the target quantity of target expanded memories for writing data is equal to the quantity of write times.

In some embodiments of the present disclosure, in order to improve the access efficiency to the expanded memories as much as possible, in the case where the determined quantity of write times is less than the total quantity of expanded memories configured for the CPU, in the present disclosure, it is determined that the quantity of target expanded memories for writing the data fragments of the target data is the same as the quantity of write times, so as to write all data fragments of the target data into the expanded memories at one time in a parallel manner, which not only improves the access efficiency to the expanded memories to the greatest extent, but also effectively improves the time required for writing data. For example, the determined quantity of write times is 3 and the total quantity of expanded memories configured for the CPU is 5, then three expanded memories are selected as the target expanded memories. When writing three data fragments of the target data, the three target expanded memories can simultaneously write to each corresponding data fragment, so as to write the target data in parallel with the total bandwidth of the three expanded memories.

In combination with the above embodiments, in one implementation, some embodiments of the present disclo- sure further provide a data read and write method. In the data read and write method, step S33 can include step S331 to step S332.

Step S331, the expanded memories corresponding to the logical starting address is determined as the target expanded memories according to the logical starting address.

In some embodiments of the present disclosure, the logi- cal starting address and the data length for writing the target data can be determined from the data write request sent by the CPU through the above step S2, the physical address of the expanded memory corresponding to the logical starting address is determined based on the logical starting address, and the expanded memory to which the physical address belongs is determined based on the physical address. After determining the expanded memory to which the physical address belongs, the expanded memory is determined as the first target expanded memory for writing the data fragments of the target data.

Step S332, a plurality of expanded memories with the highest idle degree as the target expanded memories is determined according to the idle degree of the expanded memories and the target quantity to obtain the target quantity of target expanded memories.

In some embodiments of the present disclosure, in order to ensure that the CPU can simultaneously write in parallel with the bandwidths of a plurality of expanded memories when sending a data write request, so as to effectively improve the access efficiency to the expanded memories, in the present disclosure, the remaining space in each expanded memory is made as close as possible when writing data, so as to ensure that all the expanded memories configured for the CPU are in a nearly available state when the CPU subsequently sends a data write request, and avoid that the CPU cannot write in parallel with the bandwidths of the plurality of expanded memories or write in parallel with a larger quantity of expanded memories at the same time when the CPU subsequently sends a data write request since the spaces of one or some expanded memories are already occupied. Therefore, in the present disclosure, in order to make the remaining space in each expanded memory as close as possible when writing data, after determining the first target expanded memory, there is provided an embodi- ment for determining the subsequent target expanded memory, that is, determining idle degrees of other expanded memories except the first target expanded memory, and then determining expanded memories with the highest idle degree as target expanded memories until the quantity of all the determined target expanded memories reaches the target quantity. For example, the target quantity of target expanded memories to be used is 5, after determining the first target expanded memory, the four expanded memories with the highest ranking of idle degree among all the expanded memories configured for the CPU are determined as the target expanded memories.

In combination with the above embodiments, in one implementation, some embodiments of the present disclo- sure further provide a data read and write method. In the data read and write method, step S34 can include step S341 to step S343.

Step S341, a quantity of data write sub-requests corre- sponding to the target expanded memories is determined according to the quantity of write times and the target quantity.

In some embodiments of the present disclosure, after determining the quantity of write times for writing data and the target quantity of the determined target expanded memo- ries, all the determined target expanded memories partici- pate in each parallel write process of the data fragments of the target data, which may maximize the access efficiency to the expanded memories. This is because in the case where the quantity of write times and the target quantity of target expanded memories are determined, all determined target expanded memories participate in each parallel write pro- cess of the data fragments of the target data, which may maximize the bandwidth achieved in each parallel write process, thereby maximizing the access efficiency of the expanded memories. For example, when the quantity of write times is 30, the corresponding target data is divided into 30 data fragments, and the data of the target expanded memory is 3, at this time, three data fragments are written in parallel by the three target expanded memories at a time, and the thirty data fragments can be completely written into the expanded memories after ten times of writing in parallel. At the same time, the three data fragments are written in parallel with the maximum bandwidth in each parallel writing process, which is the sum of the bandwidths of the three target expanded memories. Therefore, in the present disclosure, when the determined quantity of write times is an integer multiple of the determined target quantity, the value obtained by dividing the determined quantity of write times with the determined target data is determined as the quantity of data write sub-requests for each target expanded memory. At this time, the quantity of data write sub-requests for each target expanded memory is the same, for example, the quantity of write times is 30 and the target quantity of target expanded memories is 3, then the corresponding quantity of data write sub-requests for each target expanded memory is 10. In the subsequent distribution of the data write sub-requests based on the actually generated positioning identifiers of the data write sub-requests, one data write sub-request is distributed to each target expanded memory in the order of the positioning identifier at a time. For example, the data write sub-requests include q1, q2, q3, q4 and q5, and the target expanded memories include a1, a2 and a3. The positioning identifier corresponding to q1 is p1, the positioning identifier corresponding to q2 is p2, the positioning identifier corresponding to q3 is p3, the positioning identifier corresponding to q4 is p4, and the positioning identifier corresponding to q5 is p5. When distributing the data write sub-request, the logical management controller distributes one data write sub-request to each target expanded memory in the order of the positioning identifier at a time, and knows that it is necessary to send the data write sub-request q1 with the positioning identifier p1 to the target expanded memory controller A1 corresponding to the first target expanded memory a1; it is necessary to send the data write sub-request q2 with positioning identifier p2 to the target expanded memory controller A2 corresponding to the second target expanded memory a2; it is necessary to send the data write sub-request q3 with positioning identifier p3 to the target expanded memory controller A3 corresponding to the third target expanded memory a3; as there is no longer a sequentially increasing target expanded memory a4 with the positioning identifier p4, it is known that the data write sub-request q4 corresponding to the positioning identifier p4 needs to be sent to the target expanded memory controller A1 corresponding to the first target expanded memory a1; and it is necessary to send the data write sub-request q5 corresponding to the positioning identifier p5 to the target expanded memory controller A2 corresponding to the second target expanded memory a2. After distributing one data write sub-request to each target expanded memory in the order of the positioning identifier at a time, the logical management controller knows the target expanded memory to which each data write sub-request should be distributed, a plurality of data write sub-requests belonging to the same target expanded memory are sent to the target expanded memory controller corresponding to the target expanded memory at the same time. Therefore, in the present disclosure, when the determined quantity of write times is not an integer multiple the determined target quantity, the determined quantity of write times is divided by the determined target data to obtain a value, and a remainder is obtained. At this time, based on a value of the remainder, the quantity of data write sub-requests of a plurality of target expanded memories with the same value as the remainder is determined as a value obtained by adding one on the basis of a value obtained by division, and the corresponding quantity of data write sub-requests for other target expanded memories is determined as a value obtained by division. For example, when the determined quantity of write times is 32 and the target quantity of target expanded memories is 3, the quantity of write times and the target quantity are divided to obtain a value of 10 and a remainder of 2. Based on the obtained result, the quantity of data write sub-requests corresponding to the top two target expanded memories in the sorting is determined to be 11, and the quantity of data write sub-requests for the last target expanded memory in the sorting is determined to be 10.

Step S342, a plurality of logical starting addresses with the same quantity as the quantity of write times corresponding to the target expanded memories in the target expanded memories are determined according to the quantity of data write sub-requests corresponding to the target expanded memories and a single data write amount.

In some embodiments of the present disclosure, since the determination of a plurality of physical starting addresses corresponding to each target expanded memory is the same, the determination of the plurality of physical starting addresses corresponding to one target expanded memory is taken as an example for explanation. The specific explanation is as follows.

For any one of all data fragments of the target data, the data fragment is written in continuous address bits when writing, and at the same time, data is written in order from an initial physical address when the data is written in the expanded memory. Therefore, after determining the target expanded memory for writing the data fragments of the target data and the quantity of data write sub-requests corresponding to the target expanded memory, an initial physical address of unwritten data is sequentially found in the target expanded memory, and then a logical address corresponding to the physical address is determined as a first logical starting address; then, starting with the first physical starting address, and taking the logical address corresponding to the second physical starting address as a second logical starting address after the interval of the physical address length corresponding to the data length of a single data write amount; then, starting with the second physical starting address, and taking the logical address corresponding to the third physical starting address as a third logical starting address after the interval of the physical address length corresponding to the data length of the single data write amount; and repeat this process until a plurality of logical starting addresses with the same quantity of data write sub-requests corresponding to the target expanded memory are obtained. For example, the quantity of data write sub-requests corresponding to the target expanded memory is 3, the physical addresses of the target expanded memory include physical addresses 1 to 500, and the single data write amount is a data length of 5, firstly, it is determined that no data is written to the physical address of the target expanded memory starting from physical address 101, and at this time, the logical address corresponding to physical address 101 of the target expanded memory is determined as the first logical starting address corresponding to the target expanded memory; then, after an interval of the data length of 5 of the single data write amount, the logical address corresponding to the physical address 106 of the target expanded memory is determined as the second logical starting address of the target expanded memory; then, after an interval of the data length of 5 of the single data write amount, the logical address corresponding to the physical address 111 of the target expanded memory is determined as the third logical starting address corresponding to the target expanded memory, thereby obtaining three logical starting addresses corresponding to the target expanded memory.

In some embodiments of the present disclosure, each target expanded memory can obtain a plurality of logical starting addresses corresponding to the target expanded memory through the same implementation as above.

Step S343, the plurality of data write sub-requests with the same quantity as the quantity of write times and the positioning identifiers are generated according to all the determined logical starting addresses and the single data write amount.

In some embodiments of the present disclosure, since the determination of the positioning identifier corresponding to any logical starting address is the same, the determination of the positioning identifier corresponding to the logical starting address is taken as an example for explanation. Firstly, a ranking of the target expanded memory pointed to by the logical starting address in all determined target expanded memories is determined, and the ranking is determined as a first ranking, which is represented by Q1; and at the same time, a ranking of the physical starting address corresponding to the logical starting address in the physical starting address corresponding to each logical starting address of the target expanded memory pointed to by the logical starting address is determined, and the ranking is determined as a second sorting, which is represented by Q2. Then, based on the first ranking (Q1), the second ranking (Q2) and the determined target quantity (which is represented by Q3), a positioning identifier Q corresponding to the logical starting address is determined by the algorithm Q=(Q2−1)*Q3+Q1. Therefore, a corresponding positioning identifier can be determined for each logical starting address through the same implementation as above.

In some embodiments of the present disclosure, after determining the positioning identifier corresponding to the logical starting address, a data write sub-request corresponding to the logical starting address is generated based on the logical starting address, the positioning identifier corresponding to the logical starting address, and the determined single data write amount. Therefore, based on the same implementation, a corresponding data write sub-request can be determined for each logical starting address. Any data write sub-request will include a unique logical starting address, a positioning identifier and a single data write amount.

In combination with the above embodiments, in one implementation, some embodiments of the present disclosure further provide a data read and write method. In the data read and write method, step S4 can be: sending, by the request allocation module, the plurality of data write sub-requests to the target expanded memory controllers corresponding to the plurality of data write sub-requests respectively according to the positioning identifiers of the plurality of data write sub-requests.

In some embodiments of the present disclosure, a plurality of data write sub-requests with positioning identifiers can be determined through steps S341 to S343. As shown in FIG. 4, according to the identification order of the positioning identifiers of the data write sub-requests, one data write sub-request is distributed to each determined target expanded memory in the order of the positioning identifiers at a time. For example, the data write sub-requests include q1 to q3n, and the target expanded memories include a1, a2 and a3. The positioning identifier corresponding to q1 is p1, the positioning identifier corresponding to q2 is p2, the positioning identifier corresponding to q3 is p3, . . . , the positioning identifier corresponding to q3n is p3n. When distributing the data write sub-request, the request allocation module in the logical management controller distributes one data write sub-request to each target expanded memory in the order of the positioning identifier at a time, and knows that it is necessary to send the data write sub-request q1 with the positioning identifier p1 to the target expanded memory controller A1 corresponding to the first target expanded memory a1; it is necessary to send the data write sub-request q2 with the positioning identifier p2 to the target expanded memory controller A1 corresponding to the second target expanded memory a1; it is necessary to send the data write sub-request q3 with the positioning identifier p3 to the target expanded memory controller A3 corresponding to the third target expanded memory a3; as there is no longer a sequentially increasing target expanded memory a4 with the positioning identifier p4, it is known that the data write sub-request q4 corresponding to the positioning identifier p4 needs to be sent to the target expanded memory controller A1 corresponding to the first target expanded memory a1; it is necessary to send the data write sub-request q5 corresponding to the positioning identifier p5 to the target expanded memory controller A2 corresponding to the second target expanded memory a2; it is necessary to send the data write sub-request q6 corresponding to the positioning identifier p6 to the target expanded memory controller A2 corresponding to the second target expanded memory a2; . . . ; it is necessary to send the data write sub-request q(3n−2) corresponding to the positioning identifier p(3n−2) to the target expanded memory controller A1 corresponding to the first target expanded memory a1; it is necessary to send the data write sub-request q(3n−1) corresponding to the positioning identifier p(3n−1) to the target expanded memory controller A2 corresponding to the second target expanded memory a2; and it is necessary to send the data write sub-request q(3n) with the positioning identifier p(3n) to the target expanded memory controller A3 corresponding to the third target expanded memory a3. After distributing one data write sub-request to each target expanded memory in the order of the positioning identifier at a time, the logical management controller knows the target expanded memory to which each data write sub-request should be distributed, a plurality of data write sub-requests belonging to the same target expanded memory are sent to the target expanded memory controller corresponding to the target expanded memory at the same time.

In combination with the above embodiments, in one implementation, some embodiments of the present disclosure further provide a data read and write method. In the data read and write method, step S4 can include step S41 to step S42.

Step S41, the plurality of data write sub-requests are sent by the request allocation module to command queues of the target expanded memory controllers corresponding to the plurality of data write sub-requests respectively according to the positioning identifiers of the plurality of data write sub-requests.

In some embodiments of the present disclosure, after determining the target expanded memory controller to which each data write sub-request should be sent based on the positioning identifier of the data write sub-request, the logical management controller sends each data write sub-request to the corresponding command queue of the target expanded memory controller.

Step S42, in the case where all the data write sub-requests are sent, the target expanded memory controllers are notified to read the data write sub-requests in the command queues.

In some embodiments of the present disclosure, after sending all the data write sub-requests, the request allocation module in the logical management controller notifies each target expanded memory controller to read the data write sub-request in its own command queue, so as to perform write operations on the data fragments of the target data in parallel based on the read data write sub-request.

In combination with the above embodiments, in one implementation, some embodiments of the present disclosure further provide a data read and write method. In the data read and write method, the method further includes following steps.

Step S344, the data content is divided into a plurality of data fragments with the same quantity as the quantity of write times according to the quantity of write times.

In some embodiments of the present disclosure, the data content of the target data to be written is divided into a plurality of data fragments with the same quantity as the determined quantity of write times. For example, if the determined quantity of write times is 30, the data content of the target data is divided into 30 fragments.

Step S345, the plurality of data fragments are sequentially and cyclically stored in cache areas of the target expanded memories according to the determined target expanded memories.

In some embodiments of the present disclosure, each expanded memory is divided into a corresponding cache area, that is, there is a one-to-one correspondence between the cache area and the expanded memory. According to the determined target expanded memories the plurality of divided data fragments are sequentially and cyclically stored in the target expanded memories according to the sorting of the target expanded memories. For example, in the case where the target expanded memories include a target expanded memory a1, a target expanded memory a2 and a target expanded memory a3, and the data fragments include a data fragment 1 to a data fragment 8, a data fragment 1, a data fragment 4 and a data fragment 7 are sequentially sent to a cache area corresponding to the target expanded memory a1, a data fragment 2, a data fragment 5 and a data fragment 8 are sequentially sent to a cache area corresponding to the target expanded memory a2, and a data fragment 3 and a data fragment 6 are sequentially sent to a cache area corresponding to the target expanded memory a3.

In combination with the above embodiments, in one implementation, some embodiments of the present disclosure further provide a data read and write method. In the data read and write method, step S5 can include step S51 to step S52.

Step S51, the target expanded memory controllers are controlled to obtain the data write sub-requests in the command queues in parallel.

In some embodiments of the present disclosure, each target expanded memory controller obtains a data write sub-request from its own command queue at a time. The plurality of data read sub-requests sent to the same command queue have a sequential order, and the data write sub-requests for writing the earlier data fragments into the expanded memory will be sent to the command queue earlier.

Step S52, the target expanded memory controllers are controlled to perform write operations in parallel on the data fragments in the cache areas corresponding to the target expanded memory controllers according to the obtained data write sub-requests in the command queues, so as to write the target data into the expanded memory.

In some embodiments of the present disclosure, each target expanded memory controller obtains the data fragments from the corresponding cache area in parallel and writes the data fragments into the corresponding target expanded memory based on the data write sub-requests obtained from its own command queue. After completing a parallel write, each target expanded memory controller obtains a new data write sub-request from its own command queue at the same time, and obtains new data fragments from the corresponding cache area based on the new data write sub-request obtained from its own command queue and writes the data fragments into the corresponding target expanded memory until all target expanded memory controllers no longer have data write sub-requests in their command queues. The cache area of each expanded memory is provided by a random-access memory (RAM) in a computing terminal, and the above memory expansion system belongs to a part of the computing terminal.

In combination with the above embodiments, in one implementation, some embodiments of the present disclosure further provide a data read and write method. In the data read and write method, when the data read and write request is a data read sub-request, step S2 is: performing, by address decoding module, command parsing on the local command to determine a logical starting address and a data length for reading data.

In some embodiments of the present disclosure, in the case where the CPU needs to perform a corresponding read operation on the target data, in order to generate a plurality of data read sub-requests based on the data read request sent by the CPU, it is necessary to use the logical starting address in the data read request and the data length of the target data. Therefore, in the case where the CPU needs to perform the corresponding read operation on the target data, one implementation of the above step S2 is: performing, by the address decoding module in the logical management controller, command parsing on the corresponding local command obtained by performing data packet parsing processing to determine the logical starting address for reading the target data and the data length of the target data from all fields in the local command. Since this is for reading the target data, it does not involve the specific data content of the target data.

In combination with the above embodiments, in one implementation, some embodiments of the present disclosure further provide a data read and write method. In the data read and write method, step S3 can include step S301 to step S302.

Step S301, a first logical starting address and a first data length where all data fragments included in data to be read are located are determined according to the logical starting address and the data length.

In some embodiments of the present disclosure, since the CPU writes the target data into the expanded memory by using a data read and write method provided by the present disclosure, the logical management controller will record various data fragments in which the CPU has written the data fragments of the target data before, the specific positions in each expanded memory, and the corresponding order of all data fragments corresponding to the target data in the process of composing the target data. When the logical management controller subsequently receives the reading from the CPU for the target data, the logical management controller may determine each expanded memory where each data fragment of the target data written by the CPU is located, its specific position in each expanded memory and the corresponding order of all data fragments corresponding to the target data in the process of composing the target data, so as to determine the respective first logical starting address and first data length of all data fragments corresponding to the target data and their respective order in composing the target data. For example, the CPU has written a target data D before, and when writing, the CPU will provide the logical starting address and data length for writing, and the target data D will be divided into 30 data fragments and written in three expanded memories, while the logical management controller will record how many data fragments the logical starting address and the target data D of this data length are divided into, and at which physical addresses these data fragments are stored respectively. When the data read request from the CPU for the target data D is received again, the data read request will provide the logical starting address and the data length to be read, which are the same as those provided by the CPU in writing the target data before. At this time, the logical management controller may determine that the data to be read by the CPU is the target data D based on the logical starting address and data length in the data read request, so as to determine each expanded memory where each data fragment of the target data written by the CPU before is located and the specific position in each expanded memory based on the recorded data information, so as to determine the first logical starting address and the first data length where all data fragments corresponding to the target data are located. At the same time, since the logical management controller records how many data fragments the target data D is divided into and at which physical addresses these data fragments are stored respectively, and there is a one-to-one correspondence between the physical addresses with the logical addresses, when the CPU receives a data read request for a part of data content of the target data D, based on the logical starting address and the data length in the data read request and data information recorded by the logical management controller, the specific partial data of the target data D to be read by the CPU may also be determined, so as to determine the first logical starting address and the first data length where all data fragments included in the data to be read are located.

Step 302, a plurality of data read sub-requests with positioning identifiers are generated according to the first logical starting address and the first data length where all data fragments are located, where the positioning identifiers are configured to determine the target expanded memory controllers to which the plurality of data read sub-requests are sent.

In some embodiments of the present disclosure, after determining the first logical starting address and the first data length of all data fragments that need to be read, as well as their respective order when composing the target data, a positioning identifier corresponding to the data fragment is determined based on the order of the data fragments when composing the target data. Then, a corresponding data read sub-request is generated based on the positioning identifier, the first logical starting address and the first data length corresponding to the data fragment. Based on the same implementation, a corresponding data read sub-request can be obtained for each data fragment in all data fragments corresponding to the data to be read. The positioning identifier of the data read sub-request is used to determine which target expanded memory controller the data read sub-request should be sent to for the corresponding data read operation.

For example, the target data is divided into ten data fragments during writing, including a data fragment 1 to a data fragment 10 in order, and the order is recorded by the logical management controller during the process of writing the target data to the expanded memory. In the case where the data that the CPU needs to read is the target data, all data fragments that need to be read are the ten data fragments, and the first logical starting address and the first data length corresponding to any one of the ten data fragments are the same as the logical starting address and the data length used for writing any one of the data fragments to the expanded memory before. For a data fragment n, the logical management controller will record the order of the target data corresponding to the data fragment n as n. At this time, the positioning identifier corresponding to the data fragment n will be determined as n, where a value of n is 1 to 10. Therefore, the corresponding first logical starting address, the first data length, and the positioning identifier can be determined for any one of all data fragments corresponding to the data to be read; and correspondingly, a corresponding data read sub-request with positioning identifier can be generated for any one of all data fragments based on the first logical starting address, the first data length and the positioning identifier.

In combination with the above embodiments, in one implementation, some embodiments of the present disclosure further provide a data read and write method. In the data read and write method, the method further includes step S303: determining target expanded memories for reading data according to the first logical starting address where all data fragments are located.

In the case where the method further includes step S303, step S4 can be: sending, by the request allocation module, the plurality of data read sub-requests to the target expanded memory controllers corresponding to the plurality of data read sub-requests respectively according to the positioning identifiers of the plurality of data read sub-requests.

In some embodiments of the present disclosure, after the logical management controller determines the first logical starting addresses of all data fragments involved in the data to be read, all expanded memories corresponding to these first logical starting addresses can be determined based on the correspondence between the logical addresses with the physical addresses, and all the corresponding expanded memories are all target expanded memories that will be used for reading data at present.

In some embodiments of the present disclosure, after determining each target expanded memory for reading data, each data read sub-request is sent to the corresponding target expanded memory based on the positioning identifier of the data read sub-request.

For example, a target data D is previously written by the CPU, the target data D is divided into ten data fragments and stored in three expanded memories a1, a2 and a3. Data fragments 1, 4, 7 and 10 are stored in an expanded memory a1, data fragments 2, 5 and 8 are stored in an expanded memory a2, and data fragments 3, 6 and 9 are stored in an expanded memory a3. In the case where a logical starting address and a data length in a data read request currently initiated by the CPU represent that data to be read is the data fragments 2 to 4 of the target data D, the logical management controller can determine that the data that the CPU currently wants to read is the data fragments 2 to 4 of the target data D based on the logical starting address and the data length in the data read request currently initiated by the CPU. At the same time, the logical management controller can determine the logical addresses where the data fragments 2, 3 and 4 are respectively located based on data information recorded in the previously written target data D, where logical address with the highest ranking in the logical addresses is the logical starting address where the data fragment is located; the specific expanded memories where the data fragments are located, and the order of the three data fragments when composing the target data D is the second, the third and the fourth respectively. Based on this order, it can be determined that the three positioning identifiers are the positioning identifier p2 (which is the same as the positioning identifier used when the data fragment 2 is previously written), the positioning identifier p3 (which is the same as the positioning identifier used when the data fragment 3 is previously written), and the positioning identifier p4 (which is the same as the positioning identifier used when the data fragment 4 is previously written). Then, a data read sub-request 1 is generated based on the positioning identifier p2, the first logical starting address where the data fragment 2 is located and the first data length, a data read sub-request 2 is generated based on the positioning identifier p3, the first logical starting address where the data fragment 3 is located and the first data length, and a data read sub-request 3 is generated based on the positioning identifier p4, the first logical starting address where the data fragment 4 is located and the first data length. The logical management controller records the target expanded memory to which the positioning identifier is sent before writing data, and the positioning identifier used in the newly generated data read sub-request for reading a specific data fragment is the same as that used for writing data before the specific data fragment. Therefore, the request allocation module in the logical management controller can know which target expanded memory controller needs to be sent to the data read sub-request based on the positioning identifier in the data read sub-request, and the request allocation module in the logical management controller can send each data read sub-request to its corresponding target expanded memory controller based on the positioning identifier of the data read sub-request.

In combination with the above embodiments, in one implementation, some embodiments of the present disclosure further provide a data read and write method. In the data read and write method, sending the plurality of data read sub-requests to the target expanded memory controllers corresponding to the plurality of data read sub-requests respectively according to the positioning identifiers of the plurality of data read sub-requests can include steps S401 to S402.

Step S401, the plurality of data read sub-requests are sent by the request allocation module to command queues of the target expanded memory controllers corresponding to the plurality of data read sub-requests respectively according to the positioning identifiers of the plurality of data read sub-requests.

In some embodiments of the present disclosure, the request allocation module in the logical management controller determines the target expanded memory controller to which each data read sub-request should be sent based on the positioning identifier of the data read sub-request, and then sends each data read sub-request to the corresponding command queue of the target expanded memory controller.

Step S402, in the case where all the data read sub-requests are sent, the target expanded memory controllers are notified to read the data read sub-requests in the command queues.

In some embodiments of the present disclosure, after sending all data read sub-requests, the request allocation module in the logical management controller notifies each target expanded memory controller to read the data read sub-request in its own command queue, so as to perform parallel read operations for data fragments based on the data read sub-requests.

In combination with the above embodiments, in one implementation, some embodiments of the present disclosure further provide a data read and write method. In the data read and write method, step S5 can include step S501 to step S504.

Step S501, the target expanded memory controllers are controlled to obtain the data read sub-requests in the command queues in parallel.

In some embodiments of the present disclosure, each target expanded memory controller simultaneously obtains a data read sub-request from its own command queue at a time.

Step S502, the target expanded memory controllers are controlled to perform read operations in parallel on the target expanded memories corresponding to the target expanded memory controllers according to the obtained data read sub-requests in the command queues, and storing the read data in cache areas corresponding to the target expanded memory controllers.

In some embodiments of the present disclosure, each target expanded memory controller reads the data fragment pointed by the data read sub-request from the corresponding expanded memory in parallel based on the data read sub-request obtained from its own command queue, and stores the read data fragment into the corresponding cache area. After completing a parallel reading, each target expanded memory controller obtains a new data read sub-request from its own command queue at the same time, and based on the new data read sub-request obtained from its own command queue, reads the data fragment pointed by the data read sub-request from the corresponding expanded memory in parallel again, and stores the read data fragment in the corresponding cache area until there are no data read sub-requests in the command queues of all target expanded memory controllers.

Step S503, in the case where all data read operations are completed, sorting and packaging are performed on all the read data fragments based on an order in which the read data fragments constitute the target data to obtain the target data.

In some embodiments of the present disclosure, the plurality of data read sub-requests sent to the same command queue have a sequential order. Data read sub-requests that need to read earlier data fragments will be sent to the command queue first, and thus data fragments read in the cache area corresponding to the same expanded memory also have a sequential order. Since specific data fragments that need to be read can be determined in the logical management controller, and these data fragments will be stored in the corresponding cache area after being read, and at the same time, the plurality of data fragments stored in the same cache area have a sequential order, and thus the logical management controller can determine the sequential order of all data fragments currently read based on the cache area where the data fragments are stored and the sequential order of the plurality of data fragments in the same cache area. Based on the sequential order, the logical management controller performs sorting and packaging on all the read data fragments to obtain the target data that the CPU needs to read.

Step S504, the target data is sent to the CPU.

In some embodiments of the present disclosure, after all data fragments are packaged to obtain the target data, the obtained target data is sent to the CPU. The target data obtained by packaging is a completion packet of CXL.mem.

In combination with the above embodiments, in one implementation, some embodiments of the present disclosure further provide a data read and write method. In the data read and write method, the method further includes: initializing a communication link between the CPU and the expanded memory controller through the logical management controller; and in the case where the initialization of the communication link is completed, reading, by the CPU, memory addresses and address lengths of all expanded memories to enable the CPU to perform subsequent data reading and writing operations.

In some embodiments of the present disclosure, the preparatory work before implementing the method includes: the logical management controller communicates with the CPU and at least two expanded memory controllers based on the CXL protocol, the CPU performs memory expansion based on the CXL protocol, and after the memory expansion is completed, the communication link is initialized to enable the memory expansion system to operate normally.

In some embodiments of the present disclosure, after the initialization of the communication link is completed, the CPU reads the memory addresses and the address lengths of all configured expanded memories, so that the CPU may perform corresponding data read and write operations subsequently based on the memory addresses and the address lengths.

Figure 5:
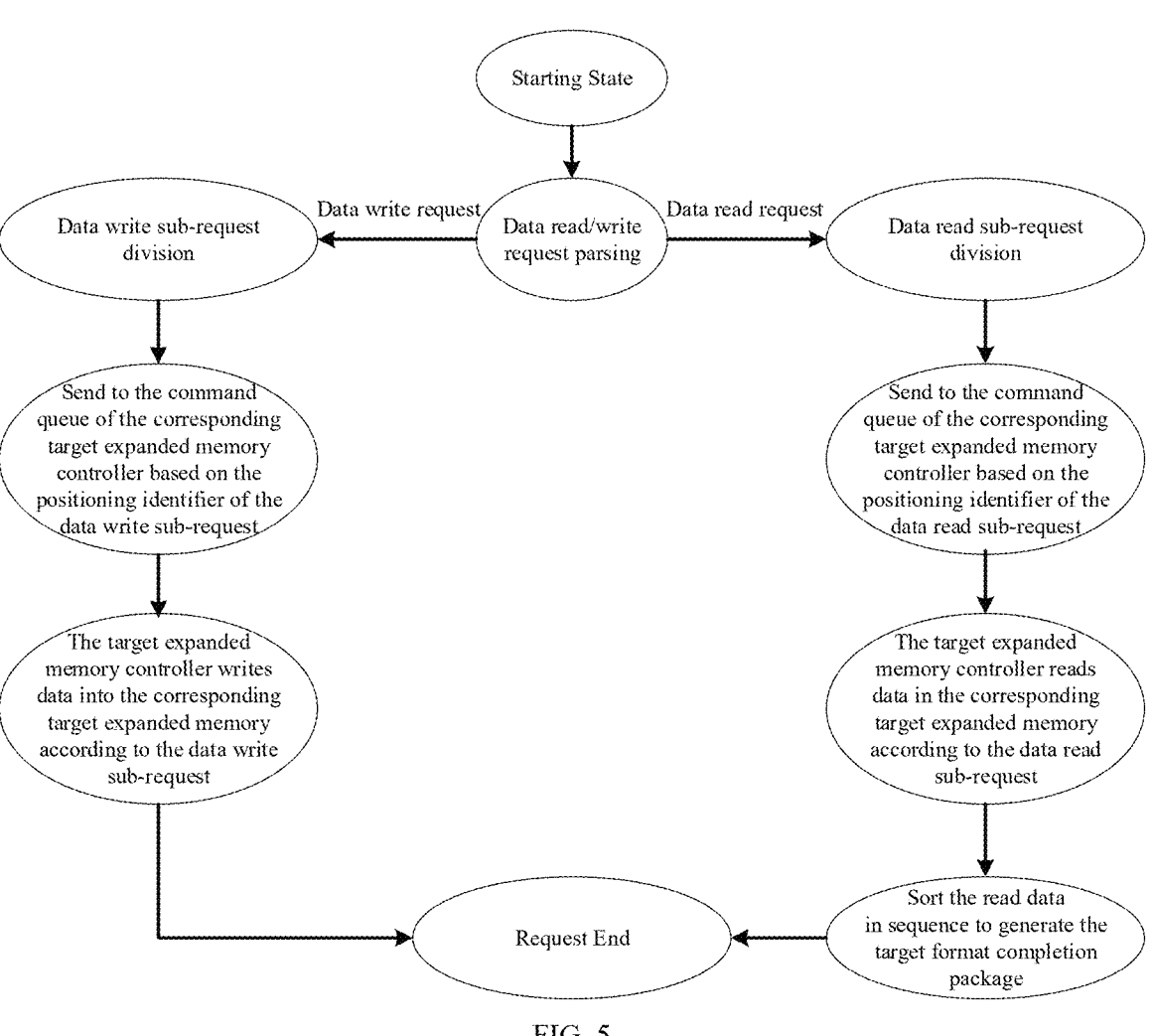
FIG. 5 is a flowchart of another data read and write method provided in some embodiments of the present disclosure.

In some embodiments of the present disclosure, as shown in FIG. 5, firstly, the CPU initiates a data read and write request, and then the logical management controller parses the data read and write request. In the case where it is determined that the data read and write request is a data write request, the data write request is divided into a plurality of data write sub-requests, and then the plurality of data write sub-requests are sent to command queues of corresponding target expanded memory controllers based on positioning identifiers of the data write sub-requests. After the plurality of data write sub-requests are sent, each target expanded memory controller obtains the data write sub-request from its own command queue in parallel, and then writes the data fragment corresponding to the data write sub-request obtained by itself to the corresponding target expanded memory controller in parallel to complete the data write operation. In the case where it is determined that the data read and write request is a data read request, the data read request is divided into a plurality of data read sub-requests, and then the plurality of data read sub-requests are sent to command queues of corresponding target expanded memory controllers based on positioning identifiers of the data read sub-requests. After the plurality of data read sub-requests are sent, each target expanded memory controller obtains the data read sub-request from its own command queue in parallel, then reads the data fragment corresponding to the data read sub-request obtained by itself from the corresponding target expanded memory controller in parallel, packages all the read data fragments in order and sends the data fragments to the CPU after completing the data read operation. Through the data read and write method provided by the present disclosure, the data read and write operations may be performed on the plurality of expanded memories in parallel, thereby improving the access efficiency of the expanded memories; and at the same time, the plurality of data read and write sub-requests divided based on a total data read and write request may be evenly distributed to each expanded memory, thereby enabling the load balancing of the expanded memories. Meanwhile, by further increasing the quantity of expanded memories, the utilization rate of the bandwidths of the expanded memories may be further improved. In addition, by adding the logical management controllers, the unified management of the address spaces of the expanded memories may be realized, thereby avoiding the resource consumption caused by the direct management of the expanded memories by the CPU, playing an isolation role and ensuring the security of data.

Figure 6:
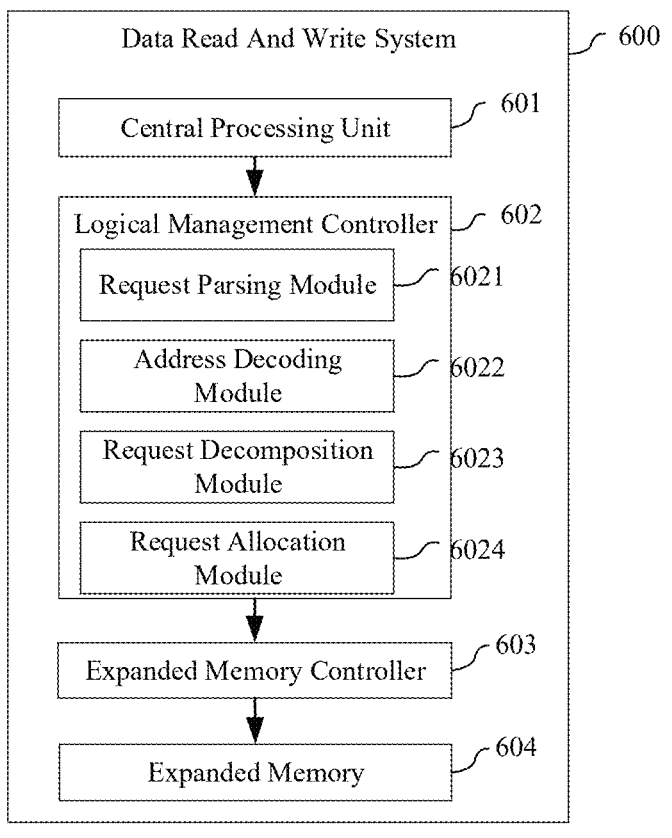
FIG. 6 is a schematic diagram of a data read and write system provided in some embodiments of the present disclosure.

Based on the same inventive concept, the second aspect of the present disclosure provides a data read and write system. As shown in FIG. 6, the system 600 includes:

a central processing unit (CPU) 601, a logical management controller 602, expanded memory controllers 603 and expanded memories 604. The logical management controller 602 includes a request parsing module 6021, an address decoding module 6022, a request decomposition module 6023 and a request allocation module 6024, where the central processing unit (CPU) 601 is configured to initiate a data read and write request for target data;

the request parsing module 6021 in the logical management controller 602 is configured to parse the received data read and write request for the target data to obtain a local command;

the address decoding module 6022 in the logical management controller 602 is configured to perform command parsing on the local command to determine location information for reading and writing data;

the request decomposition module 6023 in the logical management controller 602 is configured to generate a plurality of data read and write sub-requests based on the location information;

the request allocation module 6024 in the logical management controller 602 is configured to send the plurality of data read and write sub-requests to target expanded memory controllers; and the target expanded memory controllers in the expanded memory controllers 603 are configured to control target expanded memories corresponding to the target expanded memory controllers to perform corresponding data read and write operations in parallel according to the received data read and write sub-requests.

In some embodiments of the present disclosure, the address decoding module 6022 includes:

a first address decoding module configured to in the case where the data read and write request is a data write sub-request, perform command parsing on the local command to determine a logical starting address, a data length and data content for writing data.

In some embodiments of the present disclosure, the request decomposition module 6023 includes:

a first data determining module configured to determine a quantity of write times for writing data according to the data length in the location information;

a second data determining module configured to determine a target quantity of target expanded memories for writing data according to the quantity of write times and a total quantity of expanded memories;

a target expanded memory determining module configured to determine target expanded memories for writing data according to the logical starting address and the target quantity; and a data write sub-request generating module configured to generate a plurality of data write sub-requests with the same quantity as the quantity of write times and positioning identifiers according to the quantity of write times and the target expanded memories, where the positioning identifiers are configured to determine the target expanded memory controllers to which the plurality of data write sub-requests are sent.

In some embodiments of the present disclosure, the target expanded memory determining module includes:

a first target expanded memory determining module configured to determine the expanded memories corresponding to the logical starting address as the target expanded memories according to the logical starting address; and a second target expanded memory determining module configured to determine a plurality of expanded memories with the highest idle degree as the target expanded memories according to the idle degree of the expanded memories and the target quantity to obtain the target quantity of target expanded memories.

In some embodiments of the present disclosure, the data write sub-request generating module includes:

a data write sub-request quantity determining module configured to determine a quantity of data write sub-requests corresponding to the target expanded memories according to the quantity of write times and the target quantity;

a logical starting address determining module configured to determine a plurality of logical starting addresses with the same quantity as the quantity of write times corresponding to the target expanded memories in the target expanded memories according to the quantity of data write sub-requests corresponding to the target expanded memories and a single data write amount; and a data write sub-request generating submodule configured to generate the plurality of data write sub-requests with the same quantity as the quantity of write times and the positioning identifiers according to all the determined logical starting addresses and the single data write amount.

In some embodiments of the present disclosure, the request allocation module 6024 includes:

a data write sub-request allocation module configured to send the plurality of data write sub-requests to the target expanded memory controllers corresponding to the plurality of data write sub-requests respectively according to the positioning identifiers of the plurality of data write sub-requests.

In some embodiments of the present disclosure, the data write sub-request allocation module includes:

a first data write sub-request allocation module configured to send the plurality of data write sub-requests to command queues of the target expanded memory controllers corresponding to the plurality of data write sub-requests respectively according to the positioning identifiers of the plurality of data write sub-requests; and a second data write sub-request allocation module configured to in the case where all the data write sub-requests are sent, notify the target expanded memory controllers to read the data write sub-requests in the command queues.

In some embodiments of the present disclosure, the system 600 further includes:

a data fragment dividing module configured to divide the data content into a plurality of data fragments with the same quantity as the quantity of write times according to the quantity of write times; and a data fragment caching module configured to sequentially and cyclically store the plurality of data fragments in cache areas of the target expanded memories according to the determined target expanded memories.

In some embodiments of the present disclosure, the expanded memory controller 603 includes:

a request obtaining module configured to obtain the data write sub-requests in the command queues in parallel; and an execution module configured to perform write operations on the corresponding data fragments in the corresponding cache area in parallel according to the data write sub-requests obtained in the command queues in parallel to write the target data into the expanded memories.

In some embodiments of the present disclosure, the first data determining module includes:

a single data write amount determining module configured to determine a single data write amount according to the data length in the location information; and a quantity of write times determining module configured to determine a quantity of write times for writing data according to the data length in the location information and the single data write amount.

In some embodiments of the present disclosure, the second data determining module includes:

a relationship comparison module configured to determine a relationship between the quantity of write times and the total quantity of expanded memories;

a first target quantity determining module configured to in the case where the quantity of write times is greater than or equal to the total quantity, determine that the target quantity of target expanded memories for writing data is the total quantity of all expanded memories; and a second target data determining module configured to in the case where the quantity of write times is less than the total quantity, determine that the target quantity of target expanded memories for writing data is equal to the quantity of write times.

In some embodiments of the present disclosure, the address decoding module includes:

a second address decoding module configured to in the case where the data read and write request is a data read sub-request, perform command parsing on the local command to determine a logical starting address and a data length for reading data.

In some embodiments of the present disclosure, the request decomposition module includes:

a third data determining module configured to determine a first logical starting address and a first data length where all data fragments included in data to be read are located according to the logical starting address and the data length; and a data read sub-request generating module configured to generate a plurality of data read sub-requests with positioning identifiers according to the first logical starting address and the first data length where all data fragments are located, where the positioning identifiers are configured to determine the target expanded memory controllers to which the plurality of data read sub-requests are sent.

In some embodiments of the present disclosure, the system 600 further includes:

a target expanded memory determining submodule configured to determine target expanded memories for reading data according to the first logical starting address where all data fragments are located;

the request allocation module 6024 includes:

a data read sub-request allocation module configured to send the plurality of data read sub-requests to the target expanded memory controllers corresponding to the plurality of data read sub-requests respectively according to the positioning identifiers of the plurality of data read sub-requests.

In some embodiments of the present disclosure, the data read sub-request allocation module includes:

a first data read sub-request allocation module configured to send the plurality of data read sub-requests to command queues of the target expanded memory controllers corresponding to the plurality of data read sub-requests respectively according to the positioning identifiers of the plurality of data read sub-requests; and a second data read sub-request allocation module configured to in the case where all the data read sub-requests are sent, notify the target expanded memory controllers to read the data read sub-requests in the command queues.

In some embodiments of the present disclosure, the expanded memory controller 603 includes:

a request obtaining module configured to obtain the data read sub-requests in the command queues in parallel;

an execution module configured to control the target expanded memory controllers to perform read operations in parallel on the target expanded memories corresponding to the target expanded memory controllers according to the obtained data read sub-requests in the command queues, and storing the read data in cache areas corresponding to the target expanded memory controllers;

a data synthesis module in the logical management controller configured to in the case where all data read operations are completed, perform sorting and packaging on all the read data fragments based on an order in which the read data fragments constitute the target data to obtain the target data; and send the target data to the CPU.

In some embodiments of the present disclosure, as shown in FIG. 3, FIG. 3 is a hardware architecture diagram of a data read and write system provided by the present disclosure. The modules mainly involved include a central processing unit (CPU) for initiating a data read and write request, a protocol implementation module (CXL IP) for implementing a CXL protocol, a logical management controller for implementing relevant steps of a data read and write method provided by the present disclosure, and a plurality of expanded memory controllers for controlling expanded memories corresponding to the plurality of expanded memory controllers to perform corresponding data read and write operations. The logical management controller includes at least four core modules, namely a request parsing module configured to perform packet parsing on a data read and write request initiated by CXL. mem based on the CXL protocol to obtain specific internal data content, that is, to obtain a corresponding local command; an address decoding module and a request decomposition module configured to perform command parsing on the local command to obtain core data information in the local command for generating a large quantity of data read and write sub-requests, and generate a plurality of data read and write sub-requests based on the obtained core data information; a request allocation module composed of the above data read sub-request allocation module and data write sub-request allocation module, and configured to allocate the plurality of generated data read and write sub-requests to the expanded memory controllers corresponding to the data read and write sub-requests; and a data synthesis module configured to perform sorting and packaging on all the read data fragments under the condition of completing all data read operations to obtain target data that the CPU needs to read.

Figure 7:
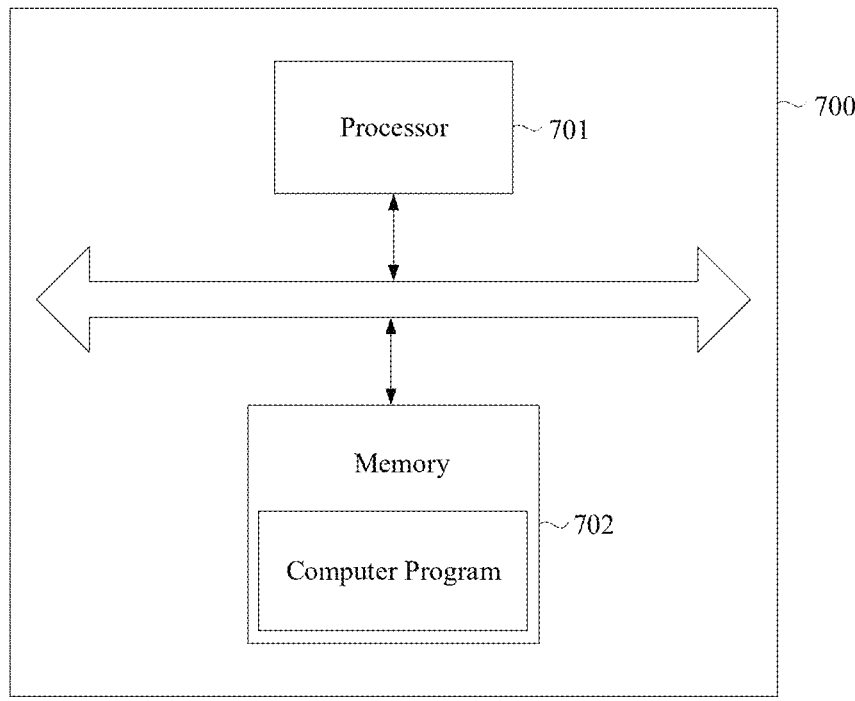
FIG. 7 is a schematic diagram of an electronic device provided in some embodiments of the present disclosure.

Based on the same inventive concept, in the third aspect of the embodiments of the present disclosure, as shown in FIG. 7, the present disclosure provides an electronic device 700, including: a processor 701, a memory 702 and a computer program stored in the memory and capable of running on the processor, where the computer program, when executed by the processor, cases the processor to implement the steps of the data read and write method described in the first aspect of the present disclosure.

Based on the same inventive concept, in the fourth aspect of the embodiments of the present disclosure, the present disclosure provides a computer non-transitory readable storage medium storing a computer program, where the computer program, when executed by a processor, cases the processor to implement the steps of the data read and write method described in the first aspect of the present disclosure.

In the above embodiments, all or part of the foregoing embodiments may be implemented by using software, hardware, firmware, or any combination thereof. When software is used for implementation, all or part of the embodiments may be implemented in a form of a computer program product. The computer program product includes one or more computer instructions. When the computer program instructions are loaded and executed on a computer, the procedures or functions according to the embodiments of the present disclosure are all or partially generated. The computer may be a general-purpose computer, a dedicated computer, a computer network, or other programmable apparatuses. The computer instructions may be stored in a computer non-transitory readable storage medium or may be transmitted from a computer non-transitory readable storage medium to another computer non-transitory readable storage medium. For example, the computer instructions may be transmitted from a website, computer, server, or data center to another website, computer, server, or data center in a wired (for example, a coaxial cable, an optical fiber or a digital subscriber line (DSL)) or wireless (for example, infrared, radio or microwave) manner.

It should also be noted that in the present disclosure, relational terms such as "first" and "second" are only used to distinguish one entity or operation from another entity or operation, and do not necessarily require or imply any such actual relationship or order between these entities or operations. Moreover, the terms "comprises", "comprising" or any other variations are intended to encompass a non-exclusive inclusion, so that processes, methods, articles, or terminal devices that include a plurality of elements include not only those elements but also other elements that are not explicitly listed, or elements inherent to such processes, methods, articles, or terminal devices. Without further limitation, an element defined by the phrase "comprising a." does not exclude the presence of additional identical elements in the processes, methods, articles, or terminal devices that include the element.

Each embodiment in this specification is described in a relevant manner, only the same and similar parts between the embodiments can be referred to each other, and each embodiment focuses on differences from other embodiments. Especially, for the system embodiments, since they are basically similar to the method embodiments, the description of the system embodiments is relatively simple, and relevant contents can be referred to the description of the method embodiments.

The above embodiments are only embodiments of the present disclosure and are not intended to limit the protection scope of the present disclosure. Any modifications, equivalent substitutions and improvements made within the spirit and principles of the present disclosure are included in the protection scope of the present disclosure.

The invention claimed is:

1. A data read and write method, applied to a logical management controller, wherein the logical management controller communicates with a central processing unit (CPU) and at least two expanded memory controllers respectively based on a compute express link (CXL) protocol, the logical management controller comprises a request parsing module, an address decoding module, a request decomposition module and a request allocation module, and the method comprises:

parsing, by the request parsing module, a received data
   read and write request for target data to obtain a local
   command;
performing, by the address decoding module, command
   parsing on the local command to determine location
   information for reading and writing data;
generating, by the request decomposition module, a plu-
   rality of data read and write sub-requests based on the
   location information;
sending, by the request allocation module, the plurality of
   data read and write sub-requests to target expanded
   memory controllers; and
controlling the target expanded memory controllers to
   perform data read and write operations in parallel
   according to the plurality of data read and write sub-
   requests,
wherein the received data read and write request is a data
   write sub-request, performing, by address decoding
   module, command parsing on the local command to
   determine the location information for reading and
   writing data and generating, by the request decompo-
   sition module, the plurality of data read and write
   sub-requests based on the location information com-
   prises:
performing, by address decoding module, command pars-
   ing on the local command to determine a logical
   starting address, a data length and data content for
   writing data;
determining a quantity of write times for writing data
   according to the data length in the location information;
determining a target quantity of target expanded memo-
   ries for writing data according to the quantity of write
   times and a total quantity of expanded memories;
determining target expanded memories for writing data
   according to the logical starting address and the target
   quantity; and generating a plurality of data write sub-
   requests with the same quantity as the quantity of write
   times and positioning identifiers according to the quan-
   tity of write times and the target expanded memories,
   wherein the positioning identifiers are configured to
   determine the target expanded memory controllers to
   which the plurality of data write sub-requests are sent.
2. The data read and write method according to claim 1,
wherein determining the target expanded memories for
writing data according to the logical starting address and the
target quantity comprises:
   determining the expanded memories corresponding to the
      logical starting address as the target expanded memo-
      ries according to the logical starting address; and
   determining a plurality of expanded memories with the
      highest idle degree as the target expanded memories
      according to the idle degree of the expanded memories
      and the target quantity to obtain the target quantity of
      target expanded memories.
3. The data read and write method according to claim 1,
wherein generating the plurality of data write sub-requests
with the same quantity as the quantity of write times and the
positioning identifiers according to the quantity of write
times and the target expanded memories comprises:
   determining a quantity of data write sub-requests corre-
      sponding to the target expanded memories according to
      the quantity of write times and the target quantity;
   determining a plurality of logical starting addresses with
      the same quantity as the quantity of write times corre-
      sponding to the target expanded memories in the target
      expanded memories according to the quantity of data write sub-requests corresponding to the target
   expanded memories and a single data write amount;
   and
generating the plurality of data write sub-requests with the
   same quantity as the quantity of write times and the
   positioning identifiers according to all the determined
   logical starting addresses and the single data write
   amount.
4. The data read and write method according to claim 1,
wherein sending, by the request allocation module, the
plurality of data read and write sub-requests to target
expanded memory controllers comprises:
   sending, by the request allocation module, the plurality of
      data write sub-requests to the target expanded memory
      controllers corresponding to the plurality of data write
      sub-requests respectively according to the positioning
      identifiers of the plurality of data write sub-requests.
5. The data read and write method according to claim 4,
wherein sending, by the request allocation module, the
plurality of data write sub-requests to the target expanded
memory controllers corresponding to the plurality of data
write sub-requests respectively according to the positioning
identifiers of the plurality of data write sub-requests com-
prises:
   sending, by the request allocation module, the plurality of
      data write sub-requests to command queues of the
      target expanded memory controllers corresponding to
      the plurality of data write sub-requests respectively
      according to the positioning identifiers of the plurality
      of data write sub-requests; and
   in the case where all the data write sub-requests are sent,
      notifying the target expanded memory controllers to
      read the data write sub-requests in the command
      queues.
6. The data read and write method according to claim 1,
wherein the method further comprises:
   dividing the data content into a plurality of data fragments
      with the same quantity as the quantity of write times
      according to the quantity of write times; and
   sequentially and cyclically storing the plurality of data
      fragments in cache areas of the target expanded memo-
      ries according to the determined target expanded
      memories.
7. The data read and write method according to claim 6,
wherein controlling the target expanded memory controllers
to perform data read and write operations in parallel accord-
ing to the plurality of data read and write sub-requests
comprises:
   controlling the target expanded memory controllers to
      obtain the data write sub-requests in the command
      queues in parallel; and
   controlling the target expanded memory controllers to
      perform write operations in parallel on the data frag-
      ments in the cache areas corresponding to the target
      expanded memory controllers according to the
      obtained data write sub-requests in the command
      queues.
8. The data read and write method according to claim 1,
wherein determining the quantity of write times for writing
data according to the data length in the location information
comprises:
   determining a single data write amount according to the
      data length in the location information; and
   determining a quantity of write times for writing data
      according to the data length in the location information
      and the single data write amount.

9. The data read and write method according to claim 1, wherein determining the target quantity of target expanded memories for writing data according to the quantity of write times and the total quantity of expanded memories comprises:
  determining a relationship between the quantity of write times and the total quantity of expanded memories;
  in the case where the quantity of write times is greater than or equal to the total quantity, determining that the target quantity of target expanded memories for writing data is the total quantity of all expanded memories; and
  in the case where the quantity of write times is less than the total quantity, determining that the target quantity of target expanded memories for writing data is equal to the quantity of write times.

10. The data read and write method according to claim 1, wherein in the case where the data read and write request is a data read sub-request, performing, by address decoding module, command parsing on the local command to determine the location information for reading and writing data comprises:
  performing, by address decoding module, command parsing on the local command to determine a logical starting address and a data length for reading data.

11. The data read and write method according to claim 10, wherein generating, by the request decomposition module, the plurality of data read and write sub-requests based on the location information comprises:
  determining a first logical starting address and a first data length where all data fragments comprised in data to be read are located according to the logical starting address and the data length; and
  generating a plurality of data read sub-requests with positioning identifiers according to the first logical starting address and the first data length where all data fragments are located, wherein the positioning identifiers are configured to determine the target expanded memory controllers to which the plurality of data read sub-requests are sent.

12. The data read and write method according to claim 11, wherein the method further comprises:
  determining target expanded memories for reading data according to the first logical starting address where all data fragments are located;
  sending, by the request allocation module, the plurality of data read and write sub-requests to target expanded memory controllers comprises:
  sending, by the request allocation module, the plurality of data read sub-requests to the target expanded memory controllers corresponding to the plurality of data read sub-requests respectively according to the positioning identifiers of the plurality of data read sub-requests.

13. The data read and write method according to claim 12, wherein sending, by the request allocation module, the plurality of data read sub-requests to the target expanded memory controllers corresponding to the plurality of data read sub-requests respectively according to the positioning identifiers of the plurality of data read sub-requests comprises:
  sending, by the request allocation module, the plurality of data read sub-requests to command queues of the target expanded memory controllers corresponding to the plurality of data read sub-requests respectively according to the positioning identifiers of the plurality of data read sub-requests; and in the case where all the data read sub-requests are sent, notifying the target expanded memory controllers to read the data read sub-requests in the command queues.

14. The data read and write method according to claim 11, wherein controlling the target expanded memory controllers to perform data read and write operations in parallel according to the plurality of data read and write sub-requests comprises:
  controlling the target expanded memory controllers to obtain the data read sub-requests in the command queues in parallel;
  controlling the target expanded memory controllers to perform read operations in parallel on the target expanded memories corresponding to the target expanded memory controllers according to the obtained data read sub-requests in the command queues, and storing the read data in cache areas corresponding to the target expanded memory controllers;
  in the case where all data read operations are completed, performing sorting and packaging on all the read data fragments based on an order in which the read data fragments constitute the target data to obtain the target data; and
  sending the target data to the CPU.

15. A data read and write system, comprising: a central processing unit (CPU), a logical management controller, expanded memory controllers and expanded memories, wherein the logical management controller comprises a request parsing module, an address decoding module, a request decomposition module and a request allocation module, wherein
  the CPU is configured to initiate a data read and write request for target data;
  the request parsing module is configured to parse the received data read and write request for the target data to obtain a local command;
  the address decoding module is configured to perform command parsing on the local command to determine location information for reading and writing data;
  the request decomposition module is configured to generate a plurality of data read and write sub-requests based on the location information;
  the request allocation module is configured to send the plurality of data read and write sub-requests to target expanded memory controllers; and
  the target expanded memory controllers in the expanded memory controllers are configured to control target expanded memories corresponding to the target expanded memory controllers to perform corresponding data read and write operations in parallel according to the received data read and write sub-requests,
  wherein the address decoding module comprises: a first address decoding module configured to in the case where the data read and write request is a data write sub-request, perform command parsing on the local command to determine a logical starting address, a data length and data content for writing data;
  the request decomposition module comprises:
  a first data determining module configured to determine a quantity of write times for writing data according to the data length in the location information;
  a second data determining module configured to determine a target quantity of target expanded memories for writing data according to the quantity of write times and a total quantity of expanded memories;

a target expanded memory determining module configured to determine target expanded memories for writing data according to the logical starting address and the target quantity; and a data write sub-request generating module configured to generate a plurality of data write sub-requests with the same quantity as the quantity of write times and positioning identifiers according to the quantity of write times and the target expanded memories, where the positioning identifiers are configured to determine the target expanded memory controllers to which the plurality of data write sub-requests are sent.

16. The data read and write system according to claim 15, wherein the logical management controller comprises:

a data synthesis module configured to in the case where all data read operations are completed, perform sorting and packaging on all the read data fragments based on an order in which the read data fragments constitute the target data to obtain the target data, and send the target data to the CPU.

17. An electronic device, comprising: a processor, a memory and a computer program stored in the memory and capable of running on the processor, wherein the computer program, when executed by the processor, cases the processor to implement the data read and write method according to claim 1.

18. A computer non-transitory readable storage medium storing a computer program, wherein the computer program, when executed by a processor, cases the processor to implement the data read and write method according to claim 1.

19. The electronic device according to claim 17, wherein in the case where the data read and write request is a data write sub-request, performing, by address decoding module, command parsing on the local command to determine the location information for reading and writing data comprises:

performing, by address decoding module, command parsing on the local command to determine a logical starting address, a data length and data content for writing data.

20. The electronic device according to claim 19, wherein generating, by the request decomposition module, the plurality of data read and write sub-requests based on the location information comprises:

determining a quantity of write times for writing data according to the data length in the location information;

determining a target quantity of target expanded memories for writing data according to the quantity of write times and a total quantity of expanded memories;

determining target expanded memories for writing data according to the logical starting address and the target quantity; and generating a plurality of data write sub-requests with the same quantity as the quantity of write times and positioning identifiers according to the quantity of write times and the target expanded memories, wherein the positioning identifiers are configured to determine the target expanded memory controllers to which the plurality of data write sub-requests are sent.

* * * * *